United States Patent
Clough et al.

(10) Patent No.: US 11,396,251 B2
(45) Date of Patent: Jul. 26, 2022

(54) PASSENGER SEATING HEADREST WITH SPRING ADJUSTMENT ASSEMBLY

(71) Applicant: REINHOLD INDUSTRIES, INC., Santa Fe Springs, CA (US)

(72) Inventors: Robert Clough, Stevenson Ranch, CA (US); Sergio Millan, Chino, CA (US)

(73) Assignee: Reinhold Industries, Inc., Santa Fe Springs, CA (US)

( * ) Notice: Subject to any disclaimer, the term of this patent is extended or adjusted under 35 U.S.C. 154(b) by 0 days.

(21) Appl. No.: 17/116,382

(22) Filed: Dec. 9, 2020

(65) Prior Publication Data
US 2021/0178947 A1 Jun. 17, 2021

Related U.S. Application Data

(60) Provisional application No. 62/947,061, filed on Dec. 12, 2019.

(51) Int. Cl.
*B60N 2/818* (2018.01)
*B60N 2/885* (2018.01)
*B60N 2/829* (2018.01)

(52) U.S. Cl.
CPC ............ *B60N 2/818* (2018.02); *B60N 2/829* (2018.02); *B60N 2/885* (2018.02)

(58) Field of Classification Search
CPC ........ B60N 2/809; B60N 2/818; B60N 2/829; B60N 2/832; B60N 2/885
See application file for complete search history.

(56) References Cited

U.S. PATENT DOCUMENTS

| | | | |
|---|---|---|---|
| 6,467,846 B2 | 10/2002 | Clough | |
| 6,607,242 B2 | 8/2003 | Estrada et al. | |
| 6,666,517 B2 | 12/2003 | Clough | |
| 7,040,705 B2 | 5/2006 | Clough | |
| 7,140,687 B2 | 11/2006 | Hoekstra et al. | |
| 7,210,734 B1* | 5/2007 | Yetukuri | B60N 2/06 297/61 |
| 7,264,313 B2 | 9/2007 | Clough | |
| 7,364,239 B2 | 4/2008 | Clough | |
| 7,500,721 B2 | 3/2009 | Beroth et al. | |
| 8,911,020 B2 | 12/2014 | Westerink et al. | |
| 9,028,000 B2* | 5/2015 | Millan | A47C 7/38 297/410 |
| 9,393,892 B1 | 7/2016 | Millan | |
| 9,783,304 B2 | 10/2017 | Zheng et al. | |
| 10,336,230 B2 | 7/2019 | Novin | |
| 2018/0319302 A1 | 11/2018 | Novin et al. | |
| 2021/0178948 A1* | 6/2021 | Clough | B64D 11/0646 |

\* cited by examiner

*Primary Examiner* — Philip F Gabler

(74) *Attorney, Agent, or Firm* — Hahn Loesser & Parks LLP

(57) ABSTRACT

The present disclosure relates to headrest assemblies for passenger vehicles. More specifically, the present disclosure describes a headrest assembly that provides adjustment between a raised position and a lowered position by way of a pair of compression springs or an over-centering linkage. Also provided herein is a method for using the same.

10 Claims, 25 Drawing Sheets

PASSENGER SEATING HEADREST WITH SPRING ADJUSTMENT ASSEMBLY

This patent application claims priority to and benefit of U.S. Provisional Application No. 62/947,061, filed Dec. 12, 2019, which is incorporated herein by reference.

BACKGROUND

This disclosure relates generally to headrests for seats. More specifically, the present disclosure relates to headrests for use with passenger seating for passenger vehicles, such as a passenger aircraft.

Passenger vehicles relied on for mass transportation, such as buses, trains, aircraft, or the like, provide a service for moving passengers from one location to the next. Passenger safety is a primary focus for seating systems and, more specifically, for a headrest of a seating system. In combination with safety, passenger comfort must also be considered. To accommodate passenger comfort and passenger safety, complexities lending to increased functionality and/or adjustability have been introduced. By example, headrests have been developed which adjust vertically, horizontally, and may even tilt. The addition of these complexities has increased the requisite interaction between a passenger and the headrest in order to affect any adjustments. Often such degree of adjustability goes unused due to space constraints and travel time constraints. When in use, such degree of adjustability sometimes results in the need and the extra effort to return the headrest to an original safety position at a later moment in time, such as when an aircraft is preparing for landing. Alternatively, if the headrest is not returned to a safety position, effectively and efficiently, passenger safety may be compromised.

Due to the complexities introduced in the prior headrests the passenger vehicle staff may also be unnecessarily burdened with the number of adjustments. By example, to focus on passenger safety, passenger vehicle staff must have seat equipment in a properly stowed position for certain travel events. Examples of such events include when a passenger aircraft prepares for departure and/or prepares for landing. The level of complexity of the seating equipment, such as by providing an increased degree of adjustability for a headrest, only increases the burden on the passenger vehicle staff thereby drawing their attention from other safety measures they are called upon for.

Therefore, what is needed is a passenger vehicle headrest that remains adjustable for passenger comfort while reducing the complexity for adjustment. More specifically, what is needed is a passenger vehicle headrest that is adjustable between positions and maintains itself in the defined position without intervention from either a passenger or passenger vehicle staff to secure the headrest in a position.

SUMMARY

The present disclosure relates to seat headrests. More specifically, the present disclosure describes a seat headrest for use in passenger vehicle seating that is adjustable and maintains itself in various positions without further intervention from a passenger or passenger vehicle staff.

In one example, a passenger seating headrest assembly is disclosed. The passenger seating headrest assembly comprises a headrest center plate having a backside. The headrest assembly also comprises a rail assembly where the rail assembly is secured to the backside of the headrest center plate. The rail assembly includes a pair of guides where each guide of the pair of guides is positioned at a respective lateral side of the rail assembly extending in a vertical direction. The headrest assembly also comprises a mounting plate and a cover plate secured together. A pair of rollers are rotatably secured to the mounting plate or the cover plate. Each roller of the pair of rollers mate with a respective guide of the pair of guides wherein the headrest center plate and the rail assembly move vertically relative the mounting plate and the cover plate. The headrest assembly also comprises an adjustment mechanism. The adjustment mechanism is provided between the headrest center plate and the mounting plate for driving the headrest center plate between a raised position and a lowered position relative the mounting plate.

In some examples the rail assembly may further comprise a groove positioned centrally within the rail assembly. The groove may extend in a vertical direction and may receive a central roller having a rotational axis parallel to the rotational axis of the pair of rollers.

In some examples the adjustment mechanism drives the headrest center plate and the mounting plate between the raised position and the lowered position only. The adjustment mechanism may be an over-centering linkage. The adjustment mechanism may comprise an opposing pair of compression springs. Each compression spring of the opposing pair of compression springs may be secured between the cover plate and the rail assembly. In some examples, the opposing pair of compression springs are in greater compression between the raised position and the lowered position than when in the raised position and/or the lowered position. In some examples the opposing pair of compression springs may be in the greatest compression when each compression spring of the opposing pair of compression springs are in a parallel orientation relative one another. The opposing pair of compression springs are constantly driven from a parallel orientation relative one another into either the raised position and the lowered position where the opposing pair of compression springs are not in the parallel orientation.

The cover plate and the headrest center plate may conceal the rail assembly and the adjustment mechanism. It may be the combination of the cover plate and the headrest which conceals the rail assembly or only the cover plate or the headrest center plate that conceals the rail assembly and the adjustment mechanism. This may occur in either the raised position or the lowered position or in both the raised position and the lowered position. Weight reducing apertures may additionally be provided in the components of the headrest assembly. In this instance, the cover plate and the headrest center plate may conceal the rail assembly and the adjustment mechanism as outlined above with the exception of the weight reducing apertures.

In another example, an adjustment mechanism is described. The adjustment mechanism may comprise a rail assembly and an opposing pair of compression springs. The opposing pair of compression springs may be secured between the rail assembly and the mounting plate. The rail assembly guides movement in a vertical direction between the rail assembly and the mounting plate. A force imparted by the opposing pair of compression springs force the rail assembly between a raised position and a lowered position while maintaining the rail assembly in either the raised position and the lowered position without additional securing mechanisms, such as for example locking mechanisms, bolts, a ratcheting mechanism, a lock nut, or the like. In some examples the opposing pair of compression springs maintain the rail assembly in either the raised position and the lowered position only. In some examples, the opposing pair of compression springs maintain the rail assembly in both the raised position and the lowered position and may further only do so. The opposing pair of compression springs are constantly driven from a parallel orientation relative one another into either the raised position and the lowered position where the opposing pair of compression springs are not in the parallel orientation.

Also disclosed is a method for adjusting a passenger seating headrest. The method comprising the steps of: (1) raising a headrest center plate relative to a mounting plate wherein the mounting plate is secured to a passenger seat, wherein the headrest center plate moves in combination with a rail assembly connected to the mounting plate by way of multiple rollers and an opposing pair of compression springs, and wherein the opposing pair of compression springs force and maintain the headrest center plate in a raised position; and (2) lowering the headrest center plate relative to the mounting plate from the raised position to a lowered position by applying a downward vertical force which overcomes a compression force of the compression springs through a centering position such that the opposing pair of compression springs maintain the headrest center plate in the lowered position. In some examples, the opposing pair of compression springs are maintained in a constant state of compression. It may be the compression springs, alone, which maintain the headrest center plate in the raised position and the lowered position. Multiple rollers may be provided to maintain the headrest center plate in a single lateral position relative to the mounting plate.

The foregoing and other objects, features, and advantages of the examples will be apparent from the following more detailed descriptions of particular examples as illustrated in the accompanying drawings wherein like reference numbers represent like parts of the examples.

BRIEF DESCRIPTION OF THE DRAWINGS

Reference is made to the accompanying drawings in which particular examples and further benefits of the examples are illustrated as described in more detail in the description below, in which.

DETAILED DESCRIPTION

Figure 1:
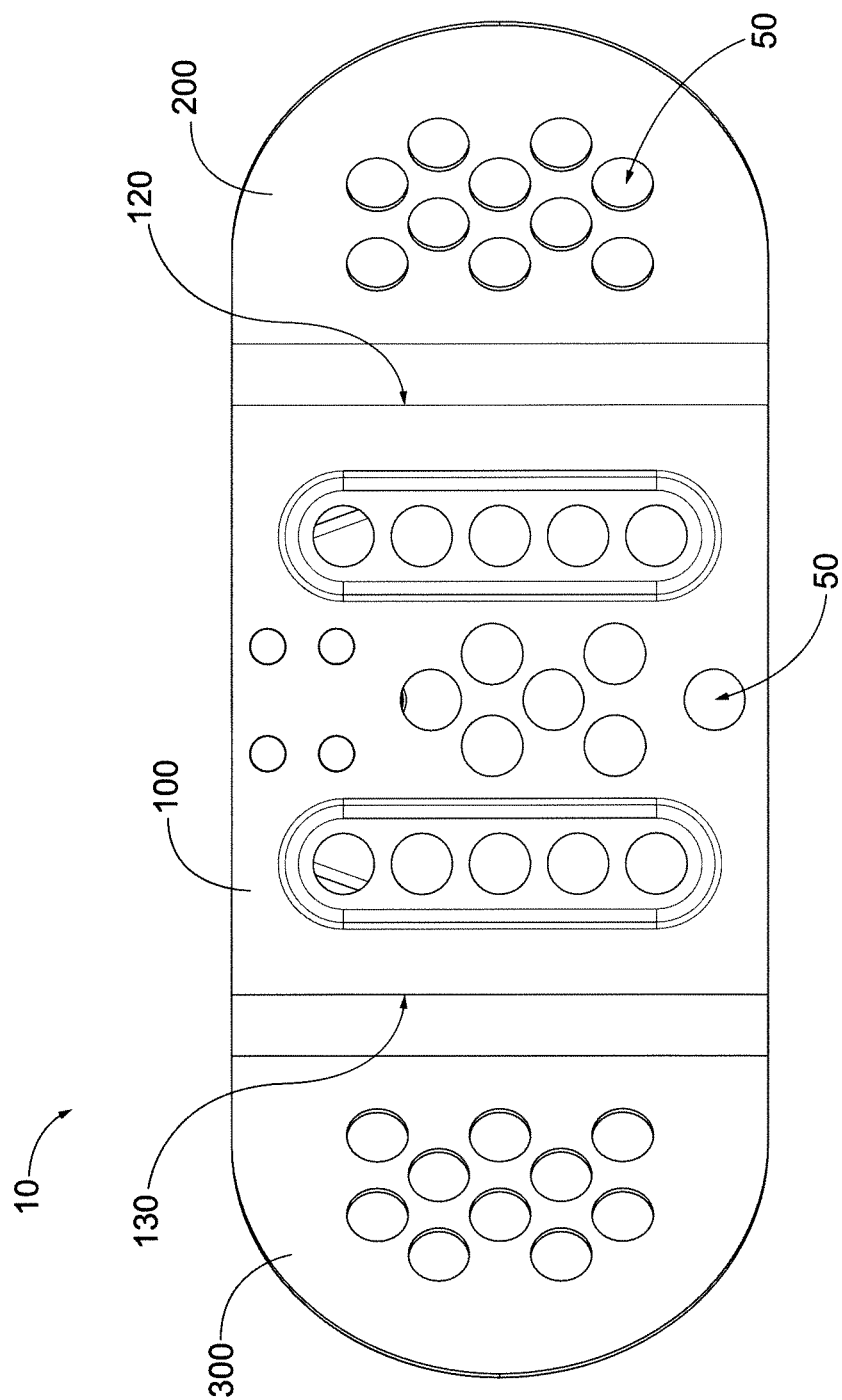
FIG. 1 is a front view of a seat headrest assembly in a lowered position, in accordance with an example of the disclosure.
Figure 2:
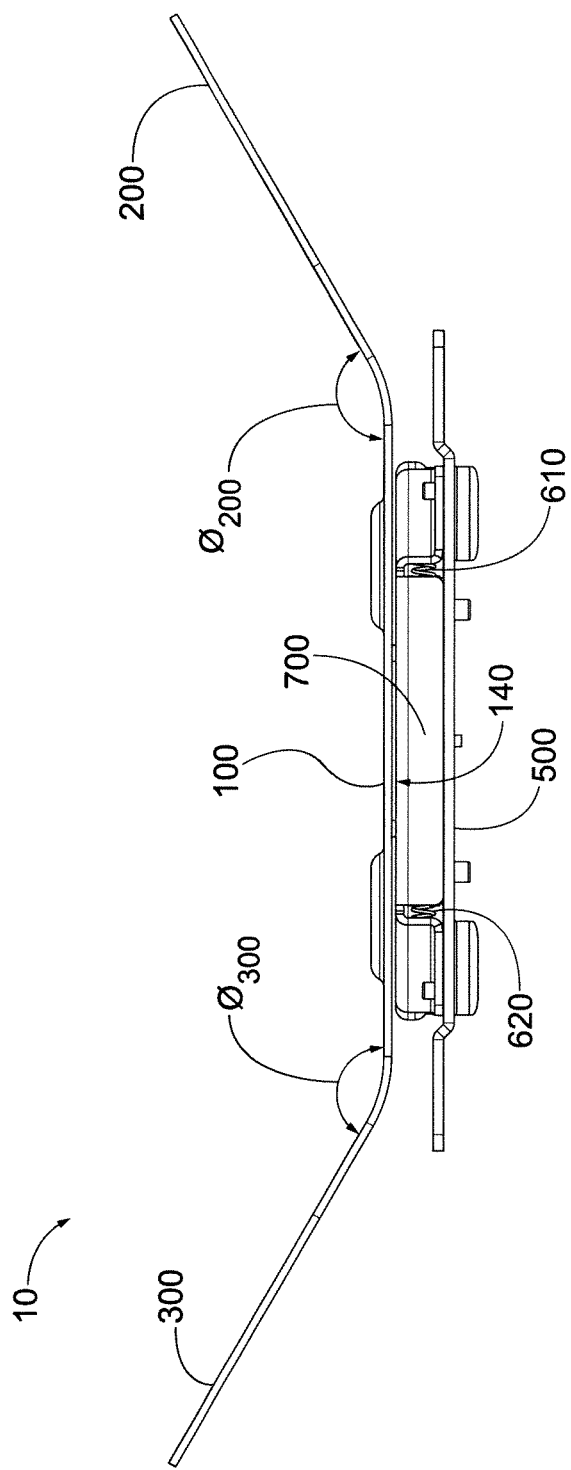
FIG. 2 is a bottom view of a seat headrest assembly in a lowered position, in accordance with an example of the disclosure.

Referring to FIG. 1, a seat headrest assembly 10 is illustrated. Specifically, FIG. 1 is a front view of the seat headrest assembly 10 comprising a headrest center plate 100 with two opposing headrest side panels, a first side panel 200 and a second side panel 300. In FIG. 1 the headrest assembly 10 is in a lowered position. The headrest side panels 200, 300 are each respectively attached to or extend from respective lateral ends of the headrest center plate 100, a first lateral end 120 and a second lateral end 130. In the example of FIG. 1, the headrest side panels 200, 300 are extensions of the headrest center plate 100. Each headrest side panel 200, 300 extend from the headrest center plate 100 at an angle oblique $\theta_{200}$, $\Theta_{300}$ to the headrest center plate 100. More specifically, each headrest side panel 200, 300 may extend from the headrest center plate 100 at the same oblique angle (as illustrated by FIG. 2) but in opposing fashion. In FIGS. 1-2, the headrest side panels 200, 300 are angled relative the headrest center plate 100 in a forward manner so to wrap around the sides of a passenger's head.

Figure 1A:
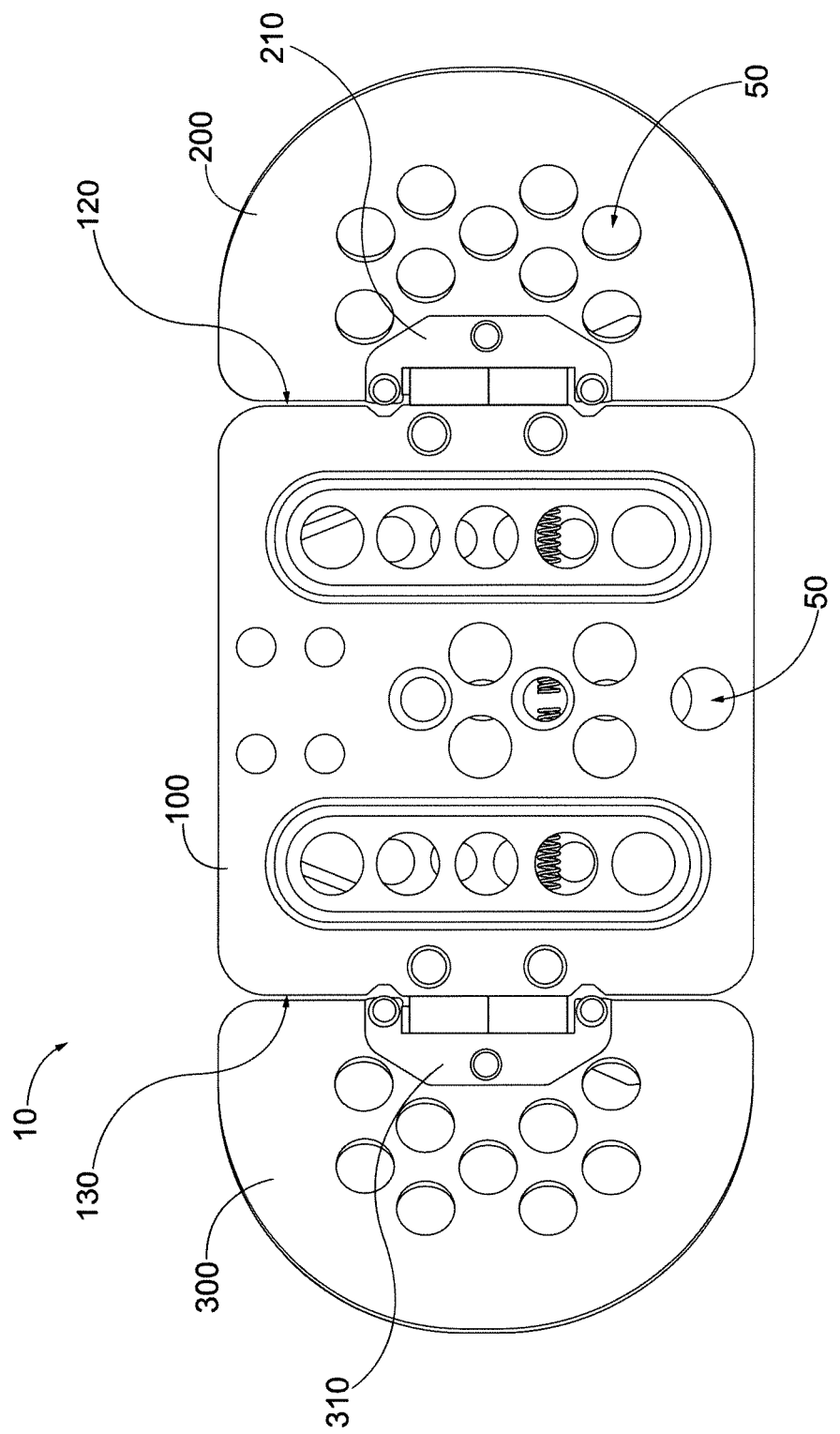
FIG. 1A is a front view of a seat headrest assembly in a lowered position, in accordance with an example of the disclosure.

FIG. 1A illustrates yet another variation of a seat headrest assembly of FIG. 1. In FIG. 1A, each respective lateral end 120, 130 is attached to the headrest center plate 100 by way of a hinge assembly 210, 310, respectively, that allow the side panels 200, 300 to move relative the headrest center plate 100 at each respective lateral end 120, 130. The hinge assemblies 210, 310 may further comprise detents. The detents provide either friction stops or hard stops for limiting the movement, and in the example illustrated by FIG. 1A, the rotation of the side panels 200, 300 relative to the respective lateral end 120, 130 of the headrest assembly. The hinge assemblies 210, 310 of FIG. 1A provide for the oblique angle of each headrest side panel 200, 300 to be adjusted relative the headrest center plate 100. Additionally, or alternatively, the hinge assemblies 210, 310 of FIG. 1A allow the side panels 200, 300 to be positioned in the same plate, or aligned with, the headrest center plate 100.

Turning to FIG. 2, a bottom view of the seat headrest assembly 10 is illustrated. The headrest center plate 100 with the first side panel 200 and the second side panel 300 is further attached to a rail assembly 400 (as will be illustrated by FIGS. 10-23). In FIG. 2, the rail assembly 400 is concealed by a cover plate 700. The rail assembly is secured directly to a backside 140 of the headrest center plate 100. The cover plate 700 is secured to a mounting plate 500. The mounting plate 500 is positioned between the backside 140 of the headrest center plate 100 and a seat structure for attaching the headrest assembly 10 to passenger seat assembly. The mounting plate 500 may be secured to a seat assembly by any means known in the art including, but not limited to, bolts, screws, clips, clamps, or the like. A pair of compression springs 610, 620 are secured between the cover plate 700 (and/or the mounting plate 500) and the rail assembly 400 (and/or the headrest center plate 100). The compression springs 610, 620 are a component of a headrest adjustment mechanism 600, as will be discussed in greater detail below.

Figure 3:
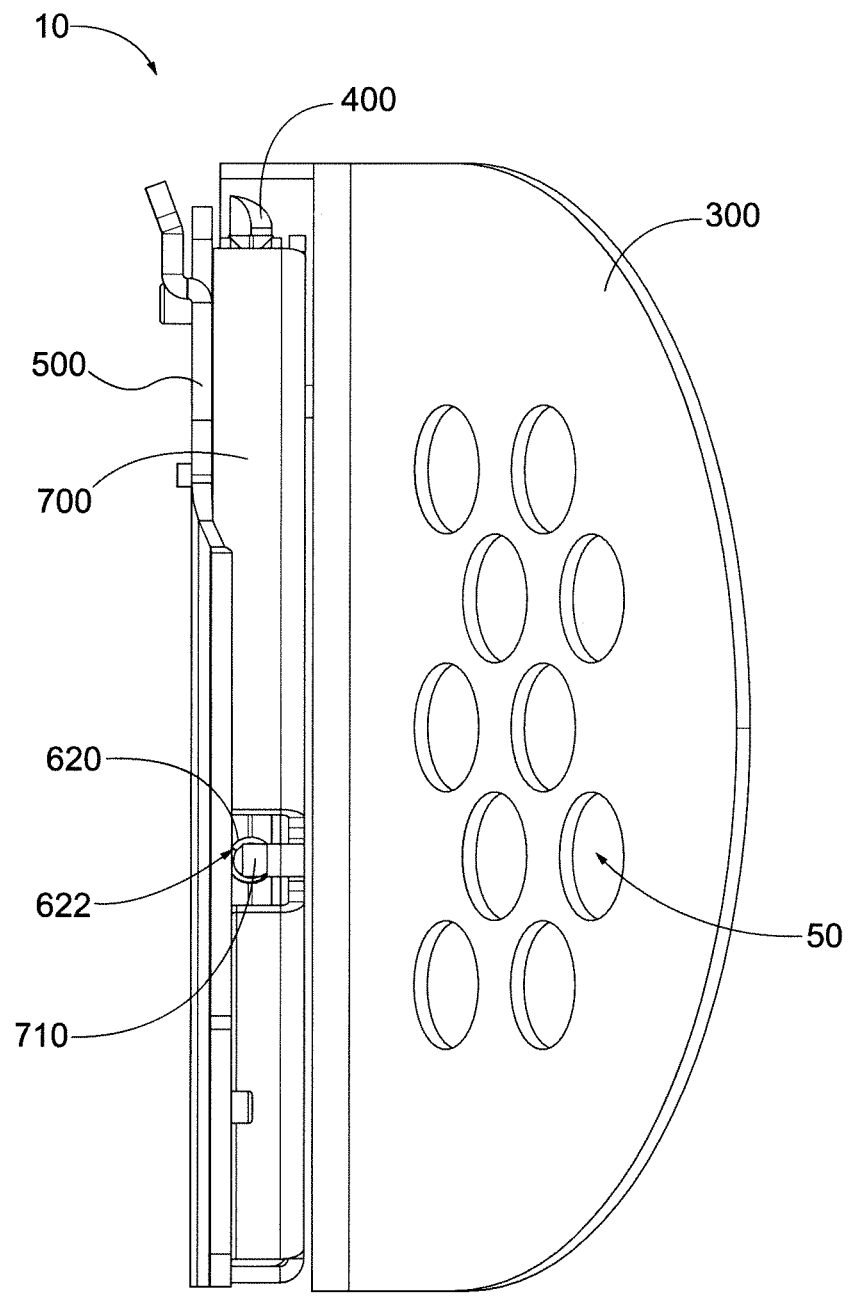
FIG. 3 is a side view of a seat headrest assembly in a lowered position, in accordance with an example of the disclosure.

In FIG. 3 a side view of the seat headrest assembly 10 is illustrated. The side panel 300 extending from the cover plate is illustrated. Also illustrated are the mounting plate 500, the cover plate 700, the rail assembly 400, and a compression spring 620, referred to herein as the second compression spring 620, of a pair of compression springs. In this example, a first end 622 of the second compression spring 620 is secured to a tab 710, or hook, extending from or formed into the cover plate 700. By securing the first end 622 to the cover plate the first end 622 of the second compression spring 620 will be maintained at this location on the cover plate 700 while the headrest position may change and the degree of compression of the compression spring additionally changes.

Figure 4:
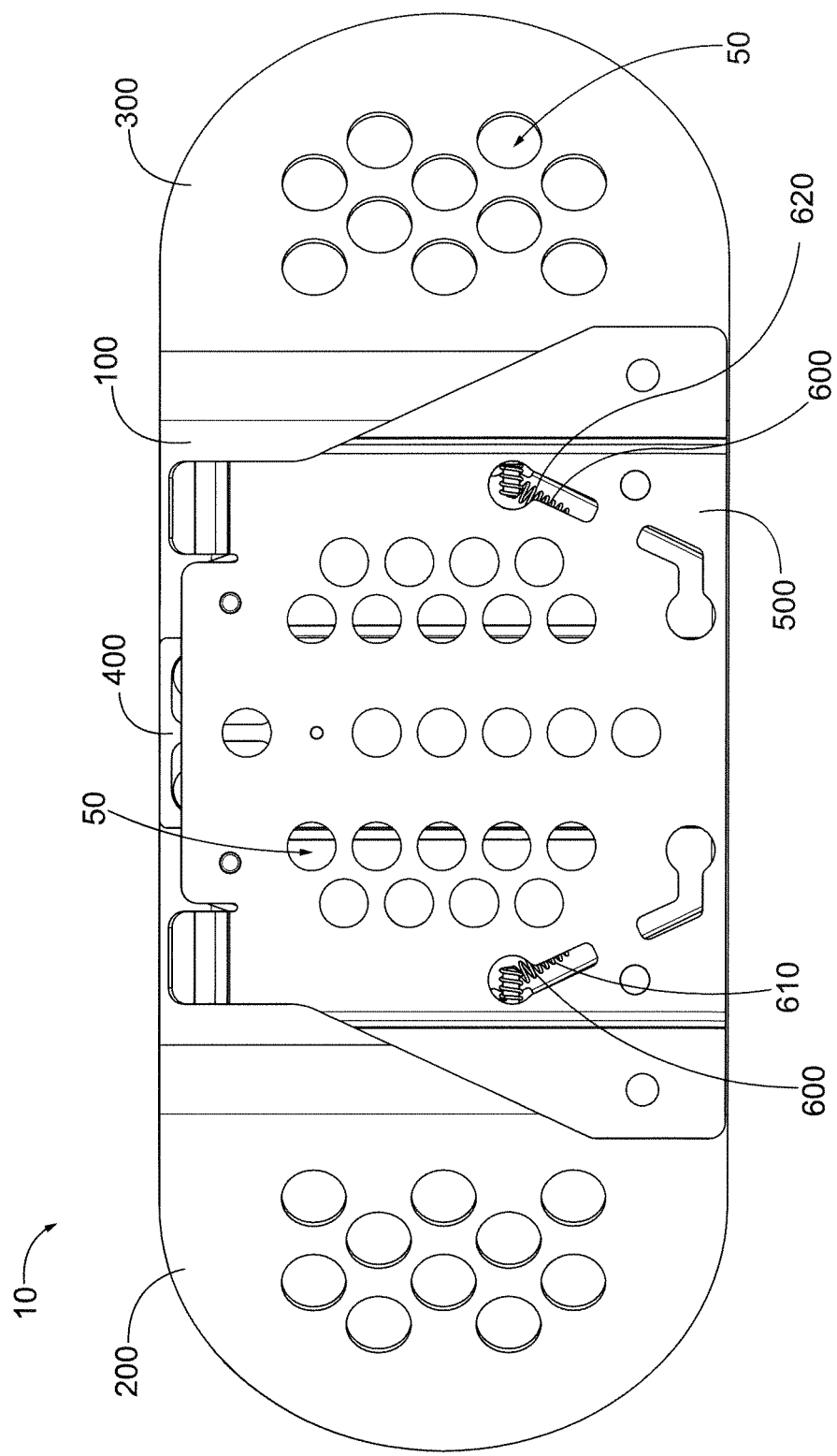
FIG. 4 is a back view of a seat headrest assembly in a lowered position, in accordance with an example of the disclosure.
Figure 5:
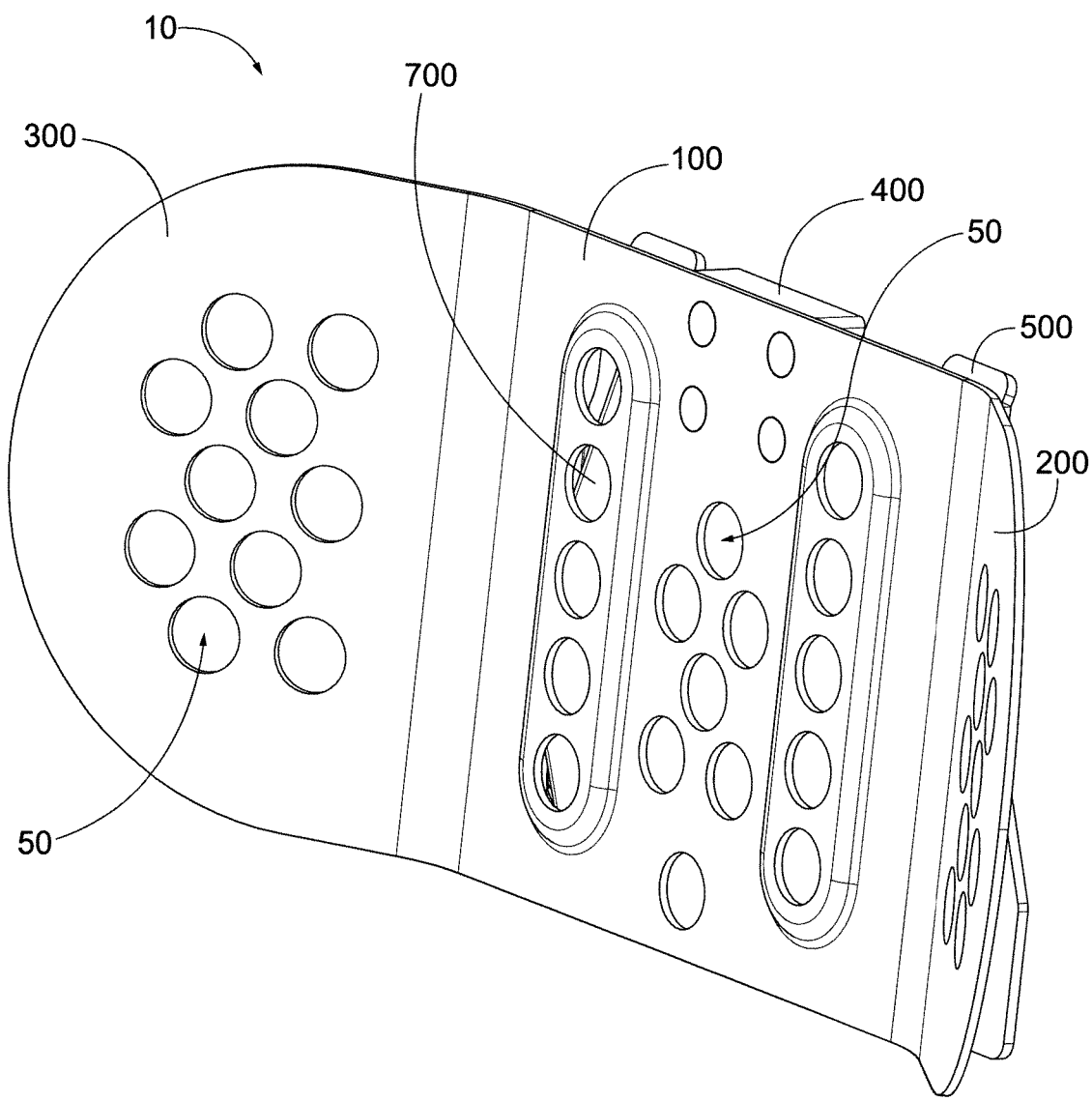
FIG. 5 is a side perspective view of a seat headrest assembly in a lowered position, in accordance with an example of the disclosure.
Figure 6:
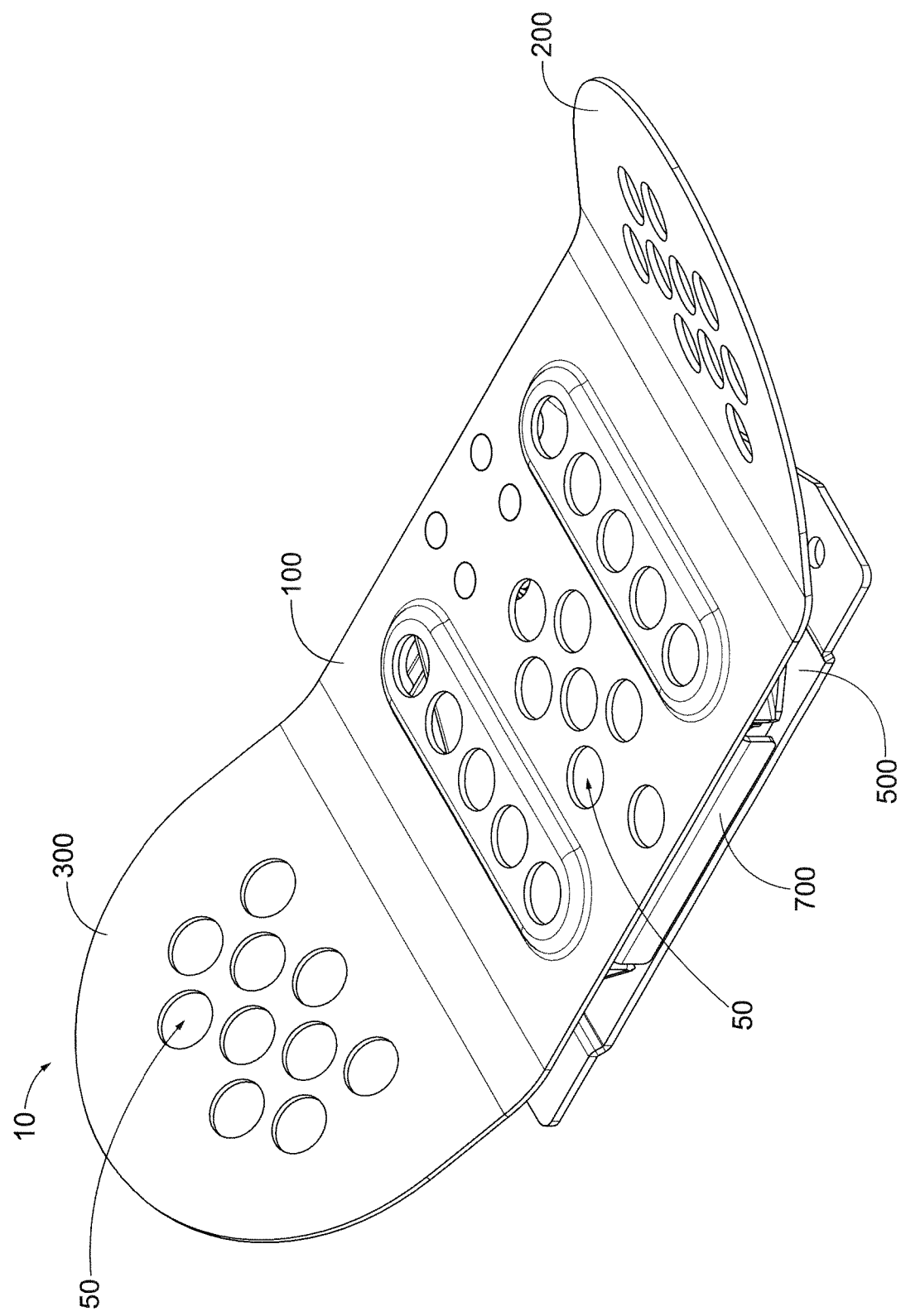
FIG. 6 is a bottom perspective view of a seat headrest assembly in a lowered position, in accordance with an example of the disclosure.

Turning now to FIG. 4, a backside view of the seat headrest assembly 10 is illustrated. From the backside view, the headrest center plate 100, first side panel 200, and second side panel 300 are illustrated. The mounting plate 500 is also illustrated with the rail assembly 400, the headrest adjustment mechanism 600, including the first compression spring 610 and the second compression spring 620, and the cover plate 700 positioned between mounting plate 500 and the headrest center plate 100. As illustrated in each of FIGS. 1, 3-8, 10-15, 17-22, and 25 weight reducing apertures 50 may be provided in one or more of each of the headrest center plate 100, the first side panel 200, the second side panel 300, the mounting plate 500, and/or the cover plate 700. The weight reducing apertures 50 may be provided to reduce the overall weight of the seat headrest assembly 10 in passenger vehicles where weight must be reserved for cargo or passengers, such as in aircraft. In the present figures, the weight reducing apertures allow features that would otherwise be entirely concealed, if there were no weight reducing apertures, to be illustrated by the present disclosure. FIGS. 5-6 provide perspective views of the same features as labeled above.

Figure 7:
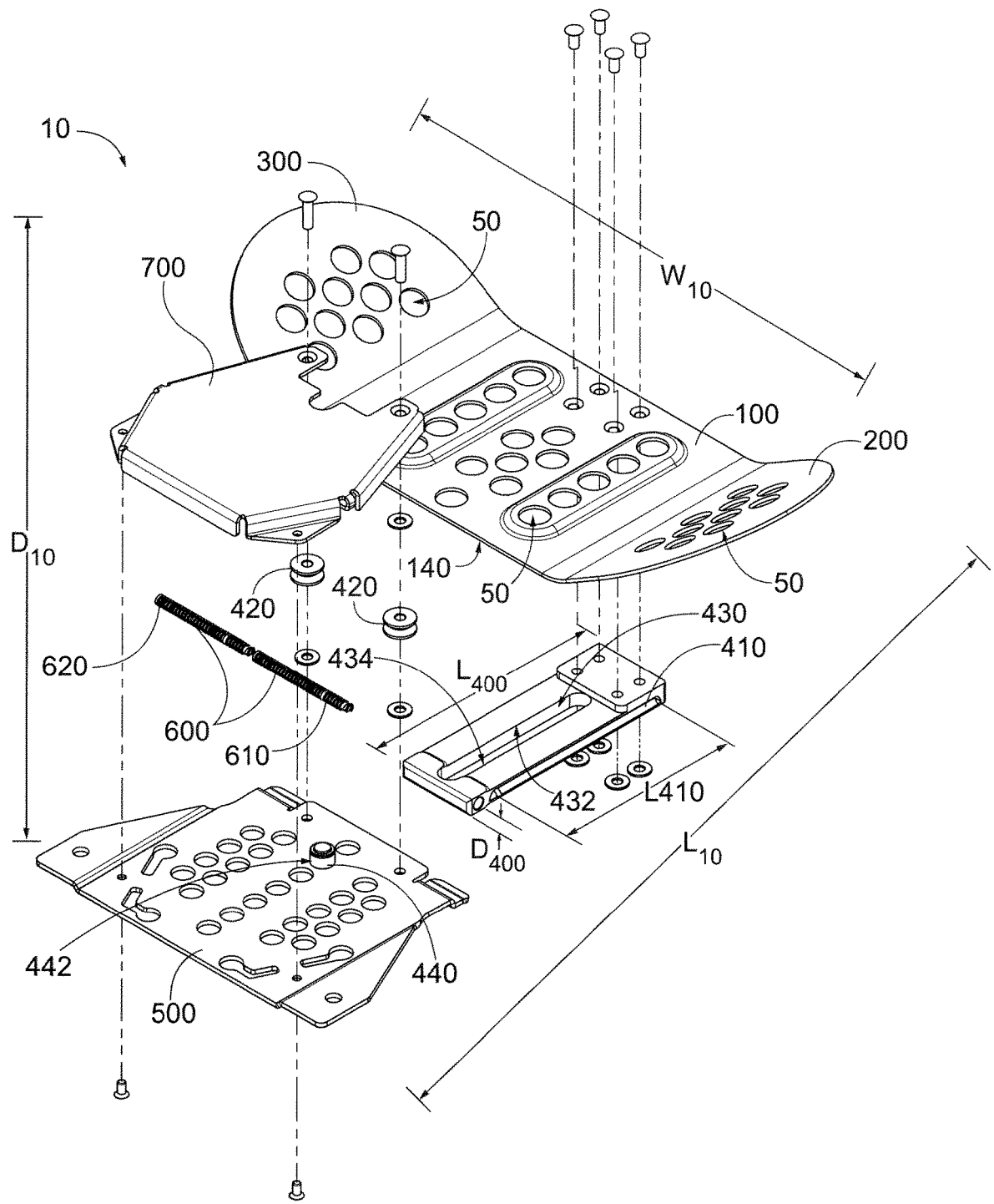
FIG. 7 is an exploded view of a seat headrest assembly, in accordance with an example of the disclosure.

FIG. 7 is an exploded view of the features of a seat headrest assembly 10. A headrest center plate 100 has a first side panel 200 and a second side panel 300 extending from opposing sides of the center plate 100. Weight reducing apertures 50 are provided throughout each of these features. Attached to the backside 140 of the headrest center plate 100 is a rail assembly 400. In this example, the rail assembly 400 is attached to the backside 140 of the headrest center plate 100 by way of a bolted connection. Any connection known in the art may be relied on to attach the rail assembly to the backside of the headrest center plate including, but not limited to, screws, adhesive, clamps, a combination thereof, or the like. The rail assembly 400 further comprises one or more guides 410. In the present example, an inverted v-shaped guide 410 extends from opposing sides of the assembly and having a guide length $L_{410}$ extending in a direction of the length of the assembly $L_{400}$. The guides are inverted v-shaped guides that mate with v-shaped rollers 420. Specifically, the apex of the guides 410 are inserted into the v-shaped configuration of the rollers 420 for providing support between the guide 410 and the rollers 420 laterally in a direction of the headrest assembly width $W_{10}$ and the headrest assembly depth $D_{10}$ (e.g. two direction laterally) while maintaining movement in a direction of the guide length $L_{410}$, or vertically. Please note, although the mating guide and the rollers may be a v-shape/inverted v-shape configuration herein the arrangement may be swapped between the rollers and the guide, such that the guide is v-shaped and the rollers are inverted v-shapes. Additionally, or alternatively, additional mating arrangements are contemplated herein such as u-shapes, rectangular grooves and rectangular rollers (or vice versa), tracks and runners, a combination thereof or any slide and/or rolling arrangement.

In the present example, two rollers 420 are rotatably secured between the mounting plate 500 and the cover plate 700 such they interface with, lock into, and/or they roll upon the surface of the inverted v-shaped groove of the rail assembly 400 when fully assembled. The rollers 420 may be directly secured to the mounting plate 500, the cover plate 700, or both. The rail assembly 400 may additionally comprise a central groove 430. The central groove 430 may be an aperture extending through the thickness $T_{400}$ of the rail assembly 400. When assembled, a central roller 440, rotatably attached to the mounting plate 500, is positioned within the central groove 430 to provide additional stability between the rail assembly 400 and the mounting plate 500. In the example of FIG. 7, the central roller 440 is offset both vertically and laterally from either roller 420 on a surface of the mounting plate 500 thereby providing a third point of contact and support. The central roller 440, however, has a rotational axis that is parallel with the rotational axis of each roller 420 in the example illustrated by FIG. 7. In the example of FIG. 7, the central groove 430 has opposing support surfaces 432, 434 which engage the rolling surface 442, or outside circumference, of the central roller 440. The central roller 440 is thereby maintained within the central groove 430 in a lateral direction while providing movement between the central roller 440 and the central groove 430 in a vertical direction. In contrast, the v-shaped configuration, or mating relationship, between the side rollers 420 and the side guides 410 not only secures the rail assembly 400 between the opposing side rollers 420, preventing lateral movement, but it additionally locks each side roller 420 at the respective side guides 410. This prevents the headrest center plate 100, attached directly to the rail assembly 400, from separating from the mounting plate 500, which is secured directly to the side rollers 420. Still yet, vertical movement is provided between the center plate 100 and the mounting plate 500 without such separating from one another.

The adjustment mechanism 600 is also illustrated in FIG. 7 by the first compression spring 610 and the second compression spring 620. The functionality of the adjustment mechanism 600 will be discussed in greater detail below. The cover plate 700 is also illustrated and is further secured to the mounting plate 500. The cover plate 700 is provided to conceal the moving components of the rail assembly 400, including the side rollers 420 and the central roller 440, and the adjustment mechanism 600 from a user when in either or both the lowered position and the raised position. Further, the cover plate 700 may additionally be relied on as a component of the adjustment mechanism 600 such that an end of each of the first compression spring 610 and the second compression spring 620 may be secured directly to the cover plate 700.

Figure 8:
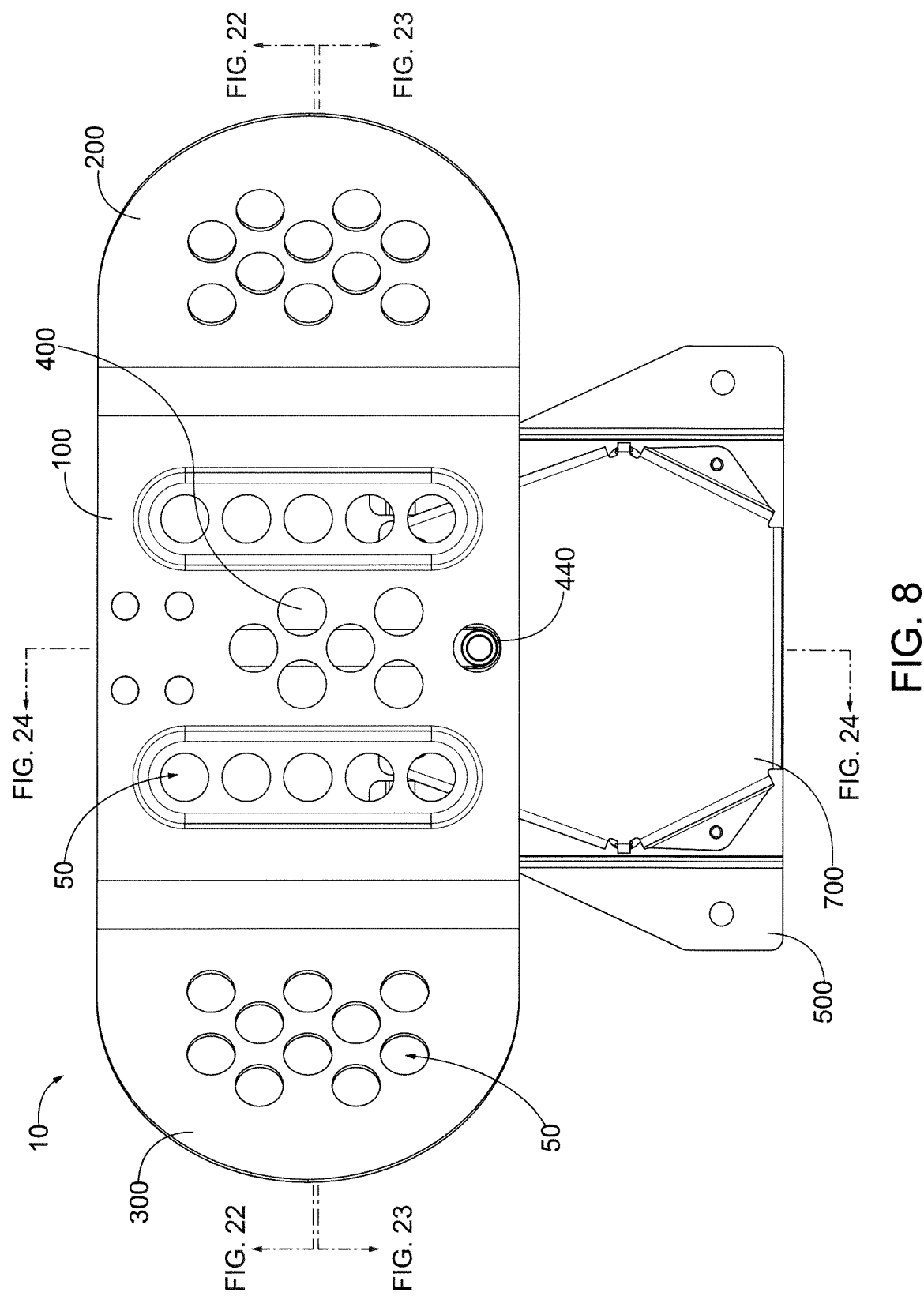
FIG. 8 is a front view of a seat headrest assembly in a raised position, in accordance with an example of the disclosure.
Figure 9:
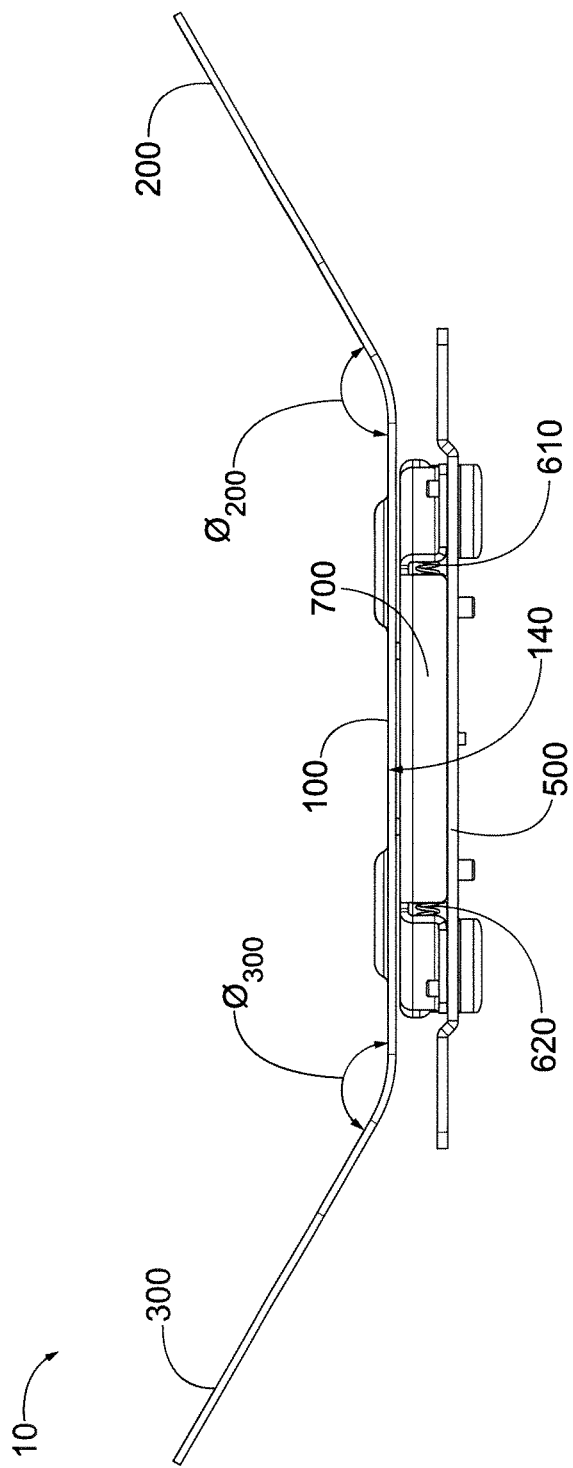
FIG. 9 is a bottom view of a seat headrest assembly in a raised position, in accordance with an example of the disclosure.
Figure 10:
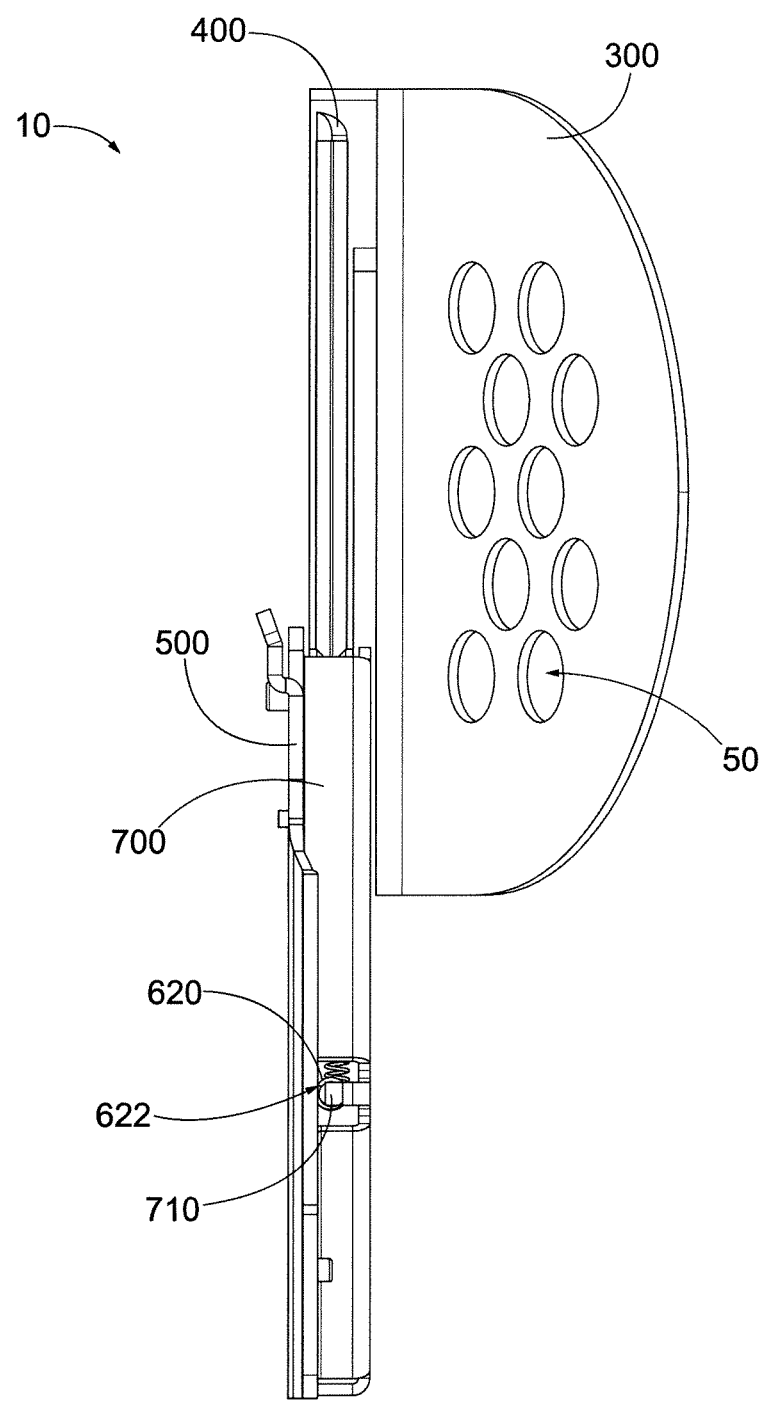
FIG. 10 is a side view of a seat headrest assembly in a raised position, in accordance with an example of the disclosure.

FIG. 8 illustrates the headrest assembly 10 of FIG. 1 but in a raised position. In the raised position, the center plate 100, the first side panel 200, the second side panel 300, and the rail assembly 400 are raised vertically relative the cover plate 700 and the mounting plate 500. As mentioned above, the cover plate 700 conceals the adjustment mechanism 600 and the rail assembly 400 from the front side. The cover plate 700 may only conceal sections of the adjustment mechanism 600 and the rail assembly 400 that are not otherwise concealed by the center plate 100, with the exception of what is visible through the weight reducing apertures 50. FIGS. 9-13 illustrate the headrest assembly 10 of FIGS. 2-6, respectively, but in a raised position. The features of FIGS. 9-13 are the same features as previously described with respect to FIGS. 2-6, respectively.

Figure 11:
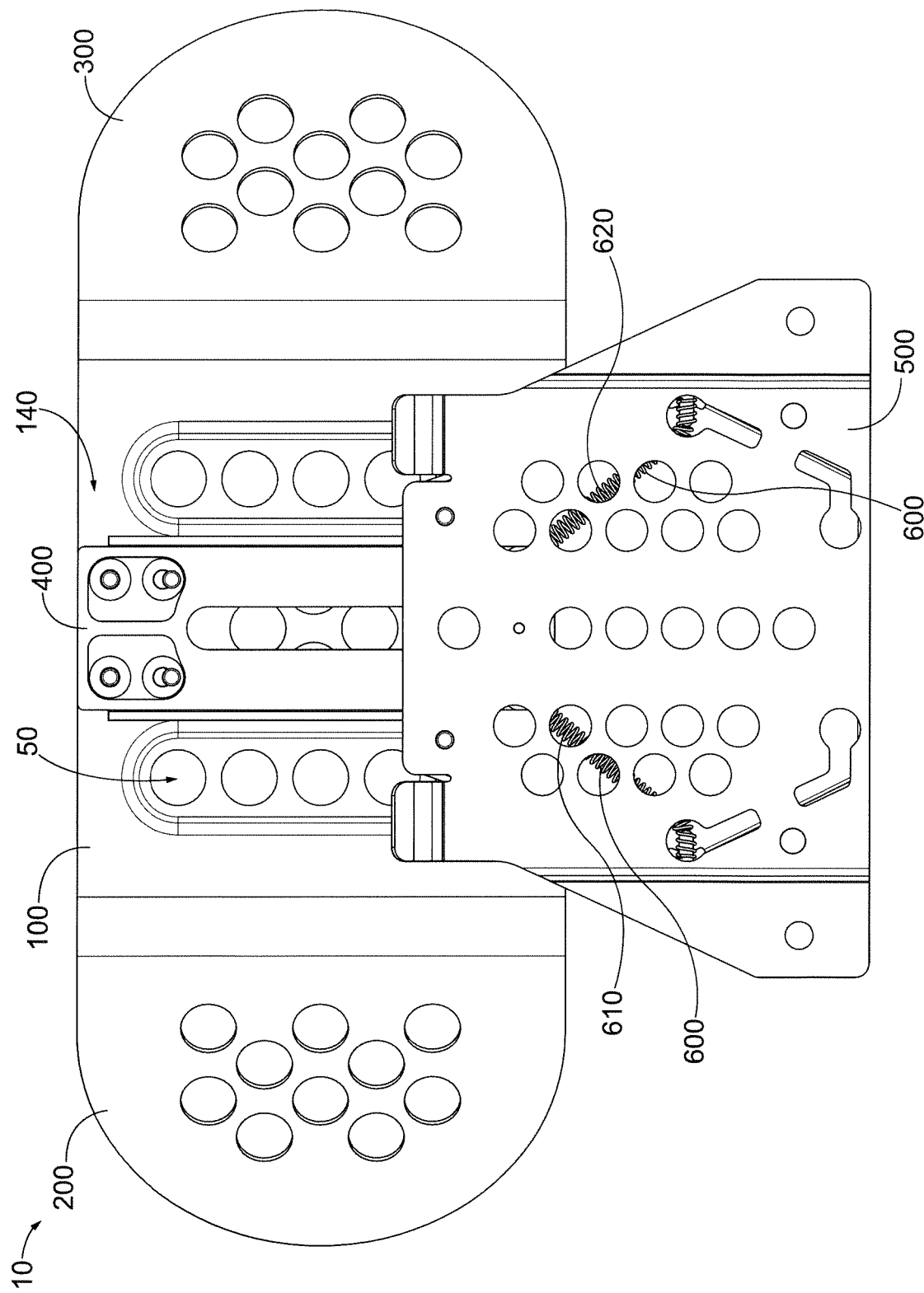
FIG. 11 is a back view of a seat headrest assembly in a raised position, in accordance with an example of the disclosure.
Figure 12:
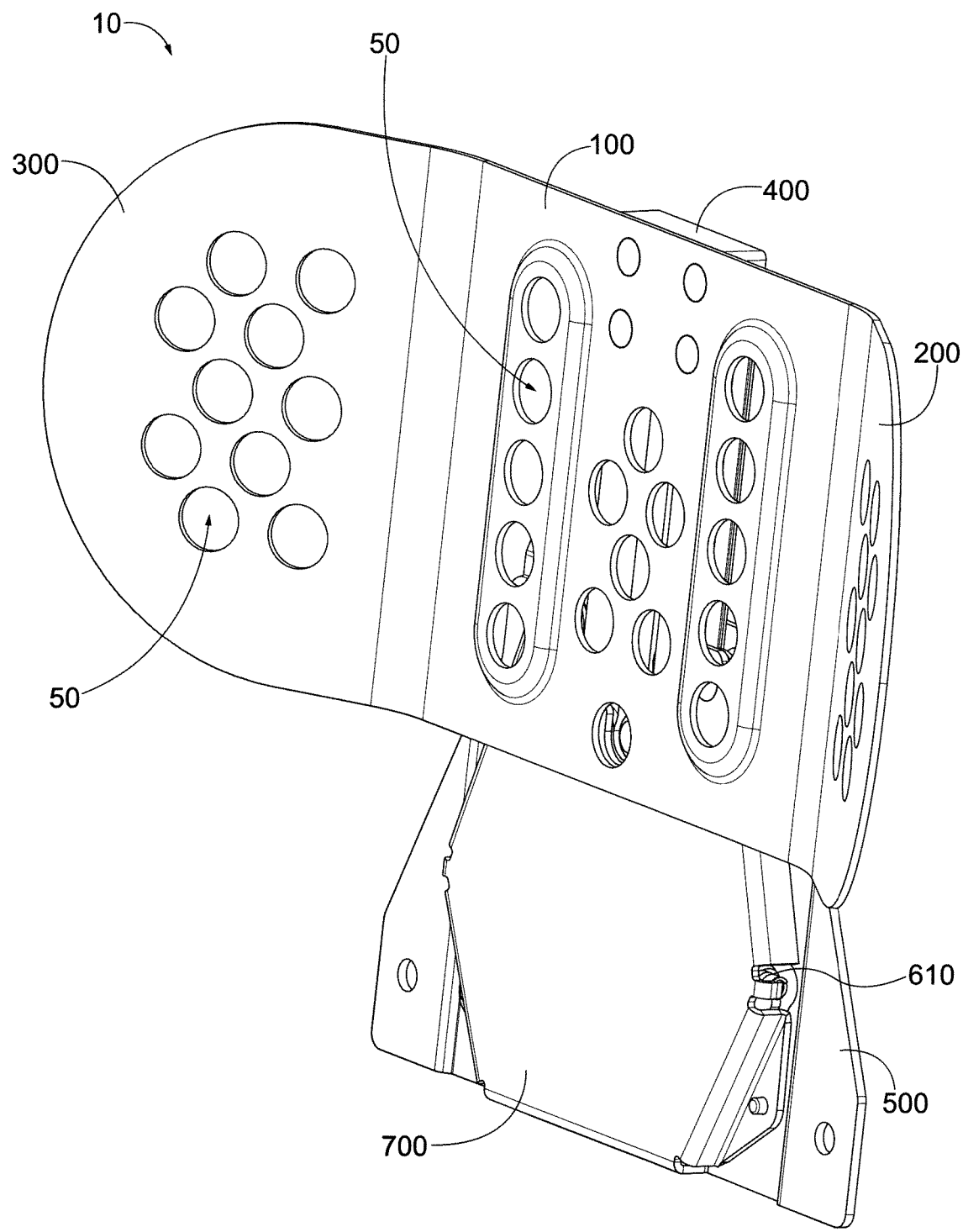
FIG. 12 is a side perspective view of a seat headrest assembly in a raised position, in accordance with an example of the disclosure.
Figure 13:
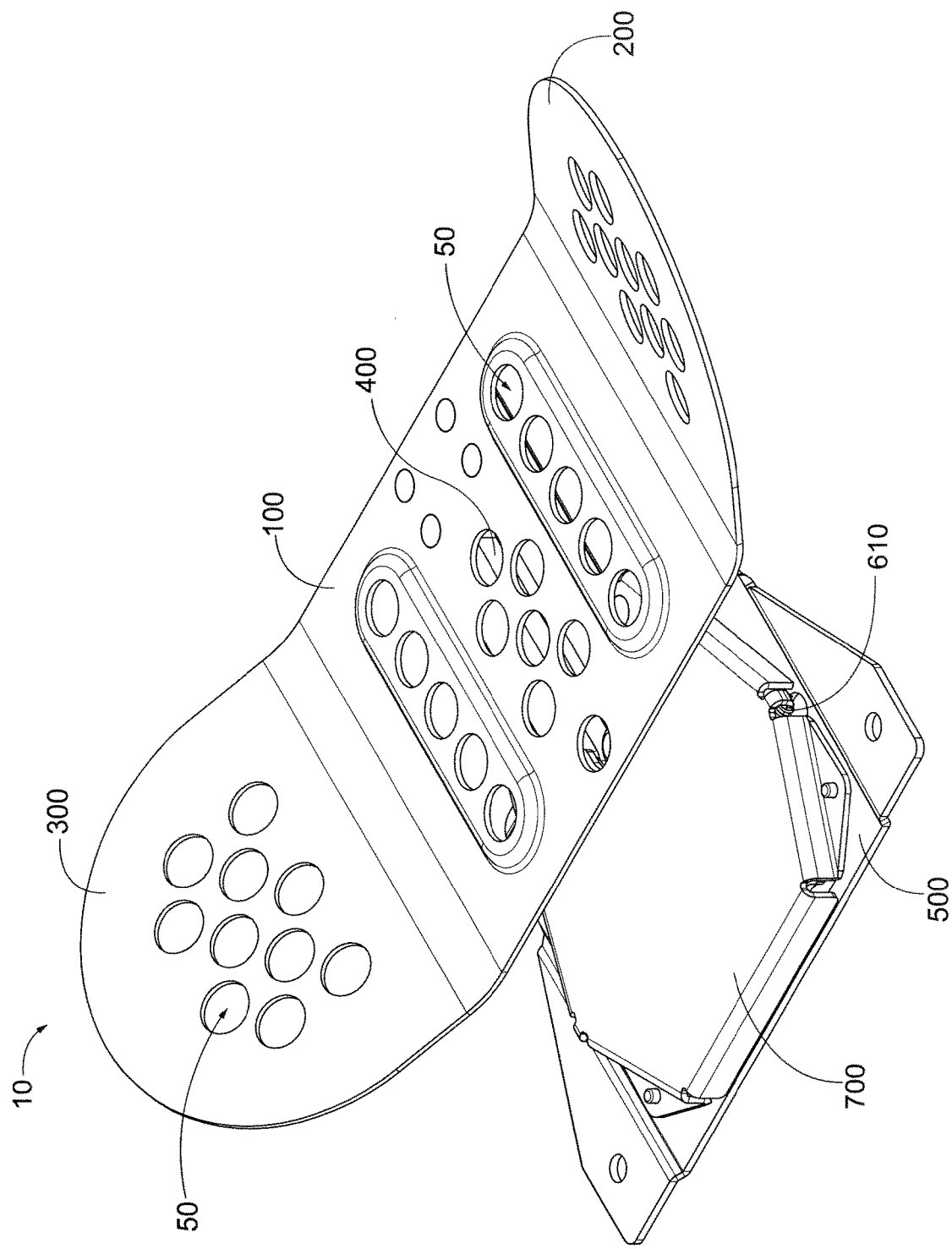
FIG. 13 is a bottom perspective view of a seat headrest assembly in a raised position, in accordance with an example of the disclosure.
Figure 14:
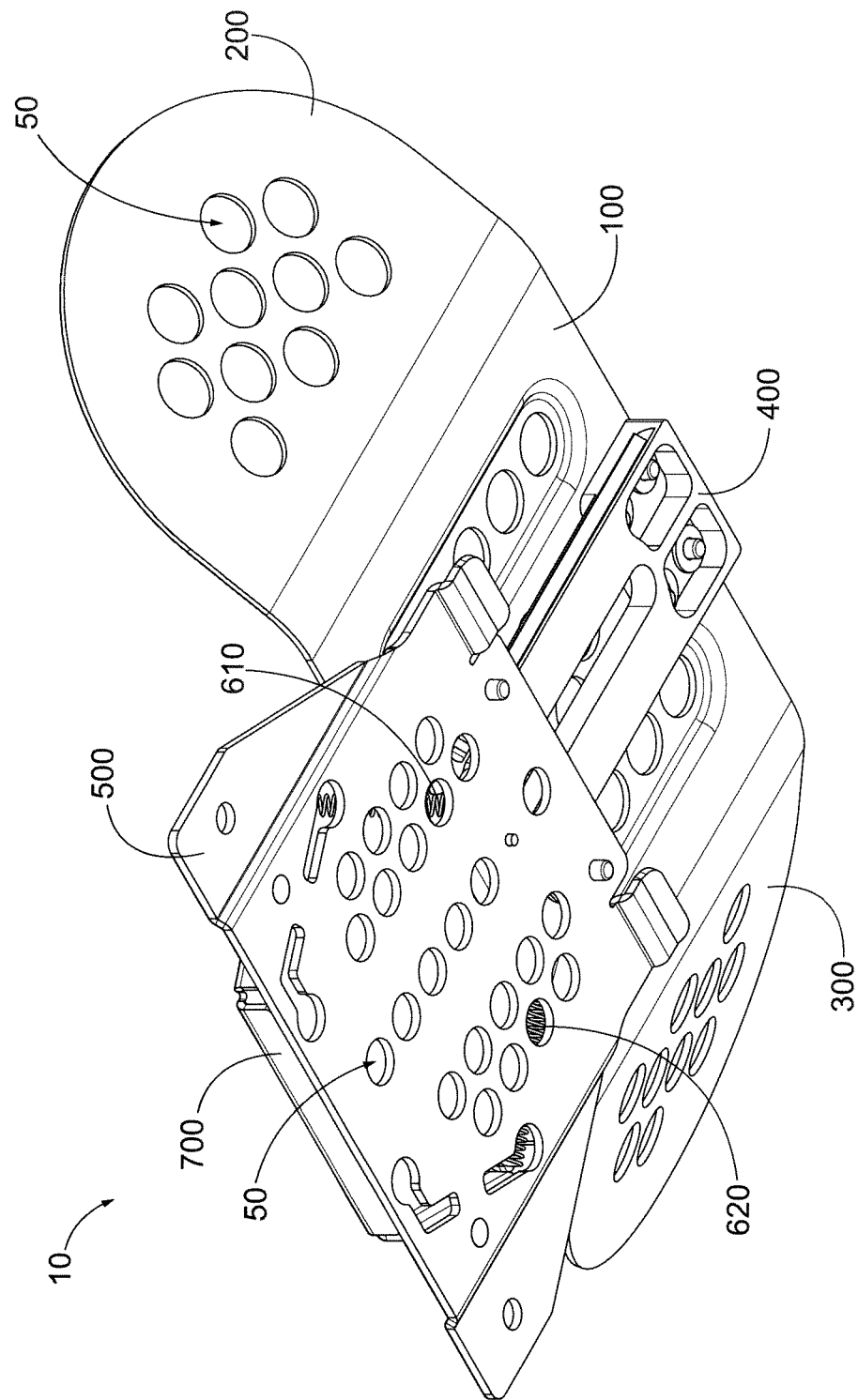
FIG. 14 is a backside perspective view of a seat headrest assembly in a raised position, in accordance with an example of the disclosure.
Figure 15:
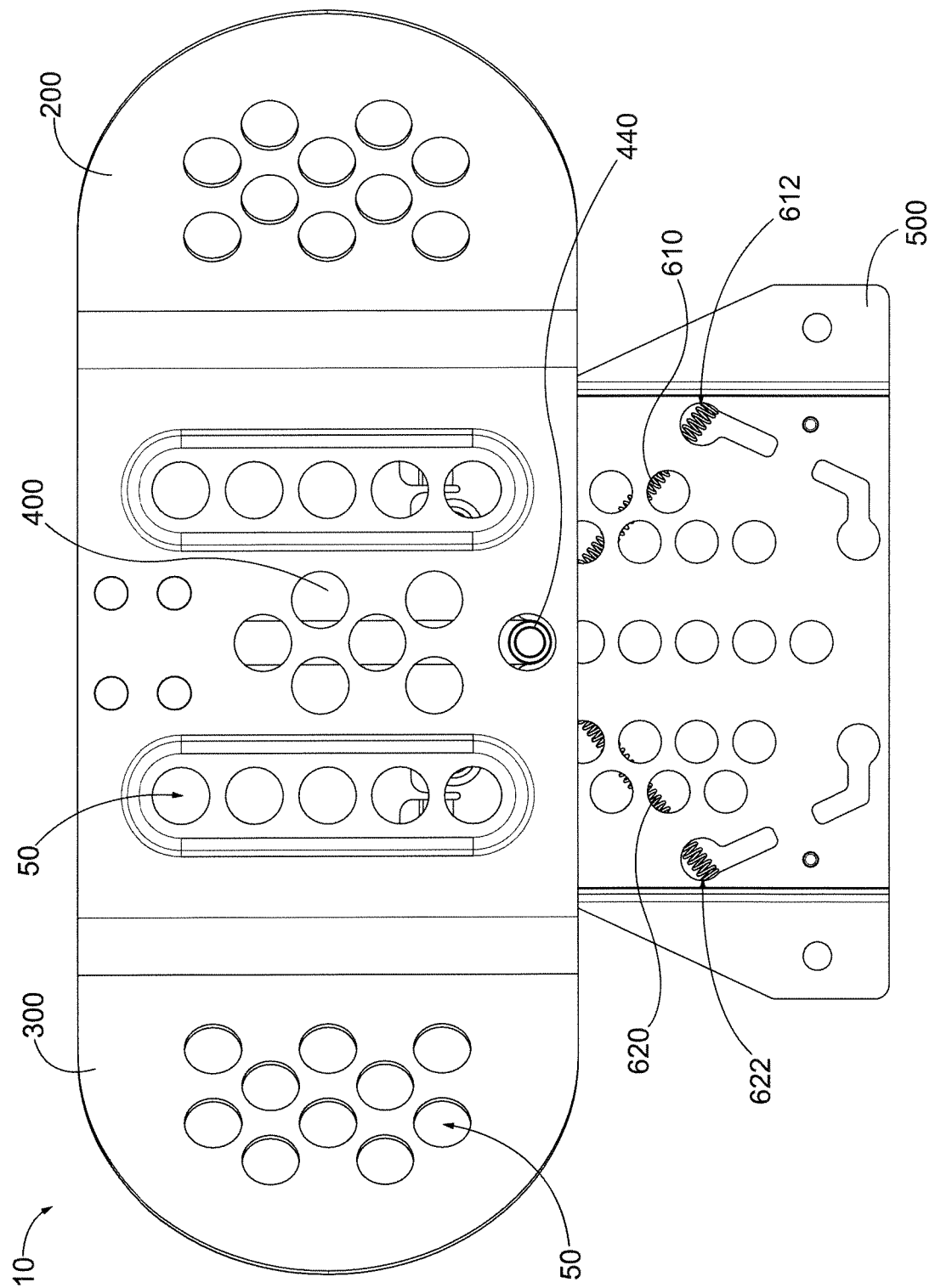
FIG. 15 is a front view of a seat headrest assembly in a raised position with the cover plate removed for clarity, in accordance with an example of the disclosure.
Figure 16:
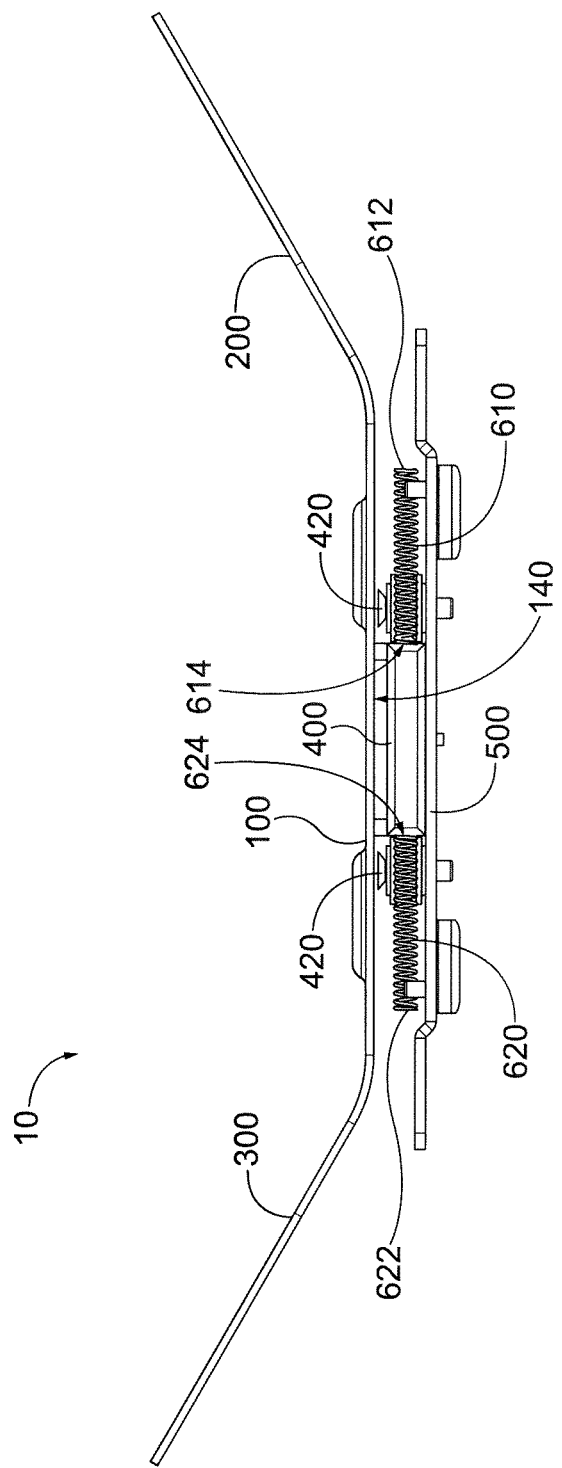
FIG. 16 is a bottom view of a seat headrest assembly in a raised position with a cover plate removed for clarity, in accordance with an example of the disclosure.
Figure 17:
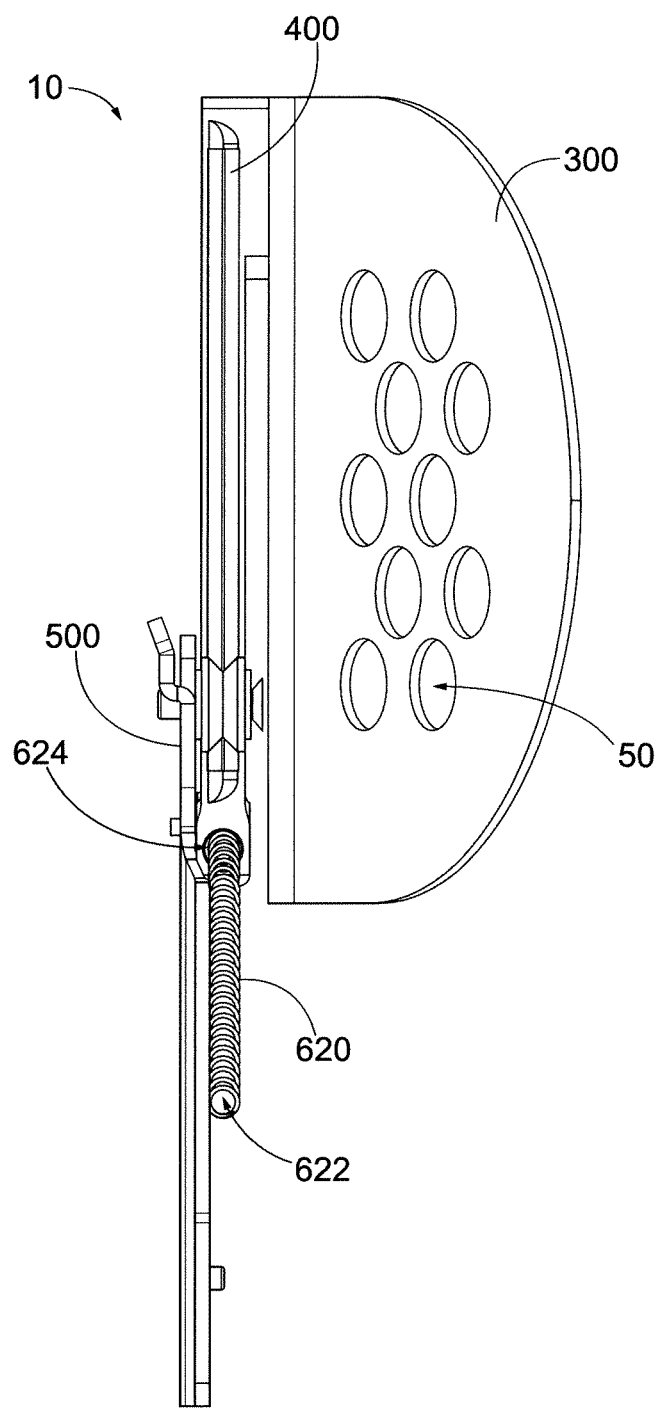
FIG. 17 is a side view of a seat headrest assembly in a raised position with a cover plate removed for clarity, in accordance with an example of the disclosure.
Figure 18:
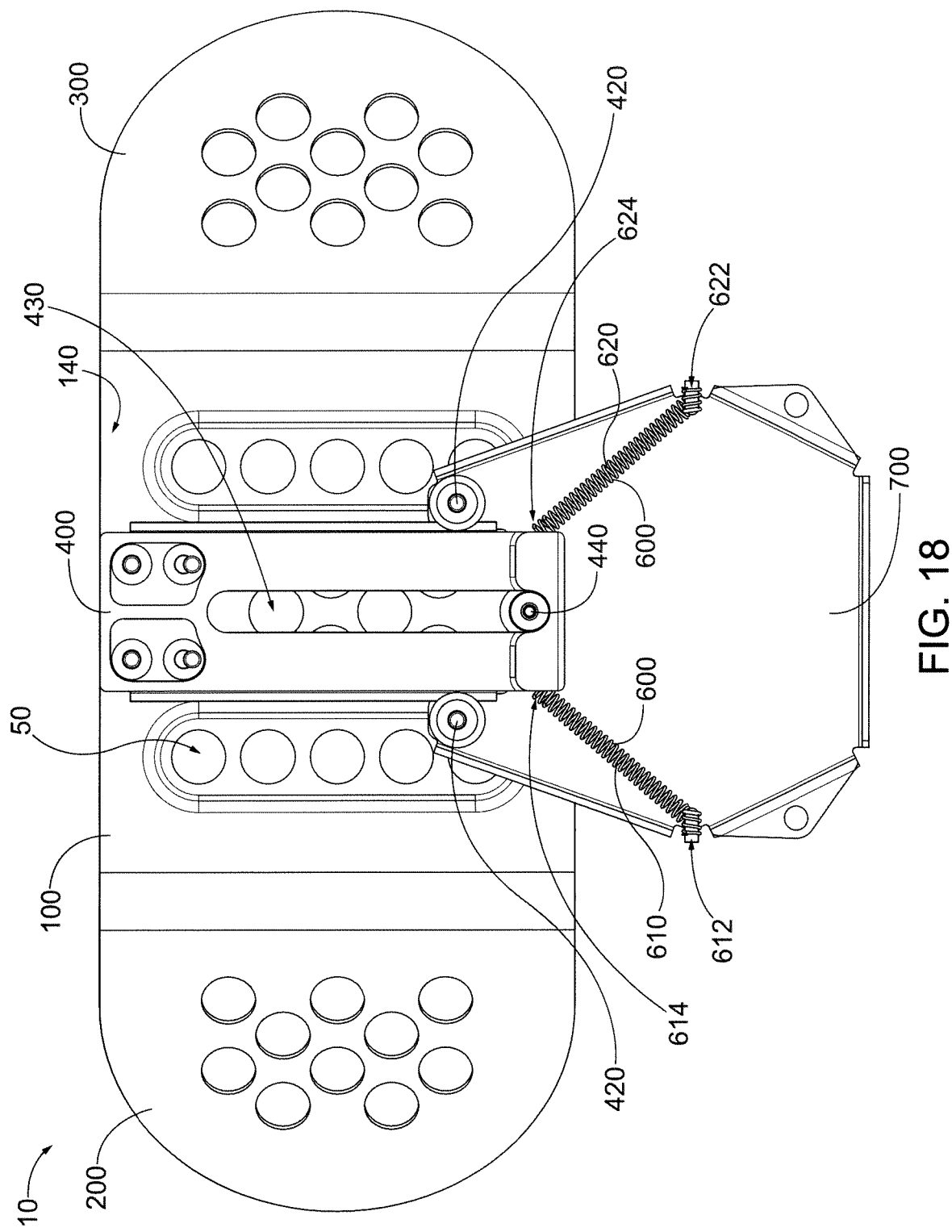
FIG. 18 is a back view of a seat headrest assembly in a raised position with a mounting plate removed for clarity, in accordance with an example of the disclosure.
Figure 19:
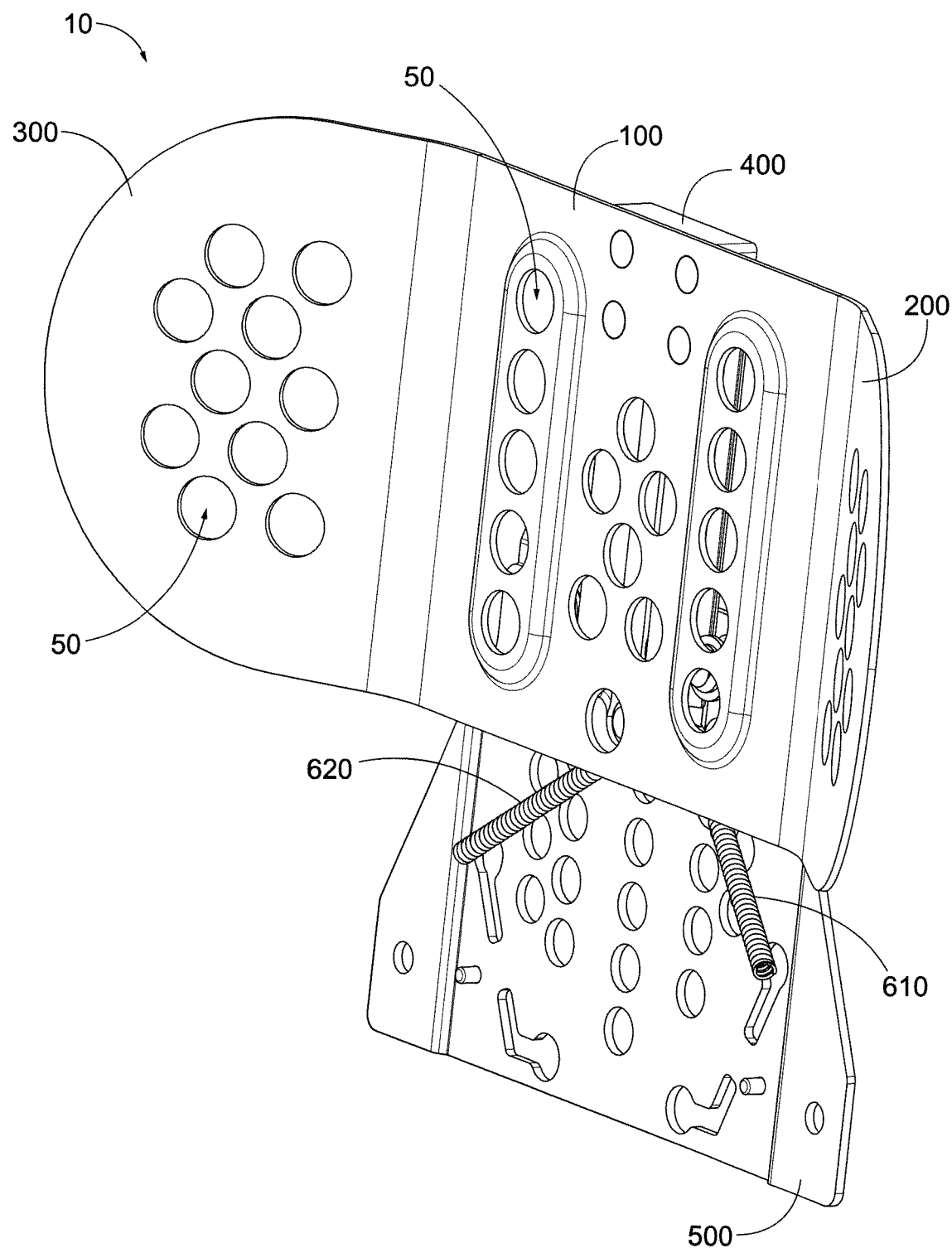
FIG. 19 is a side perspective view of a seat headrest assembly in a raised position with a cover plate removed for clarity, in accordance with an example of the disclosure.
Figure 20:
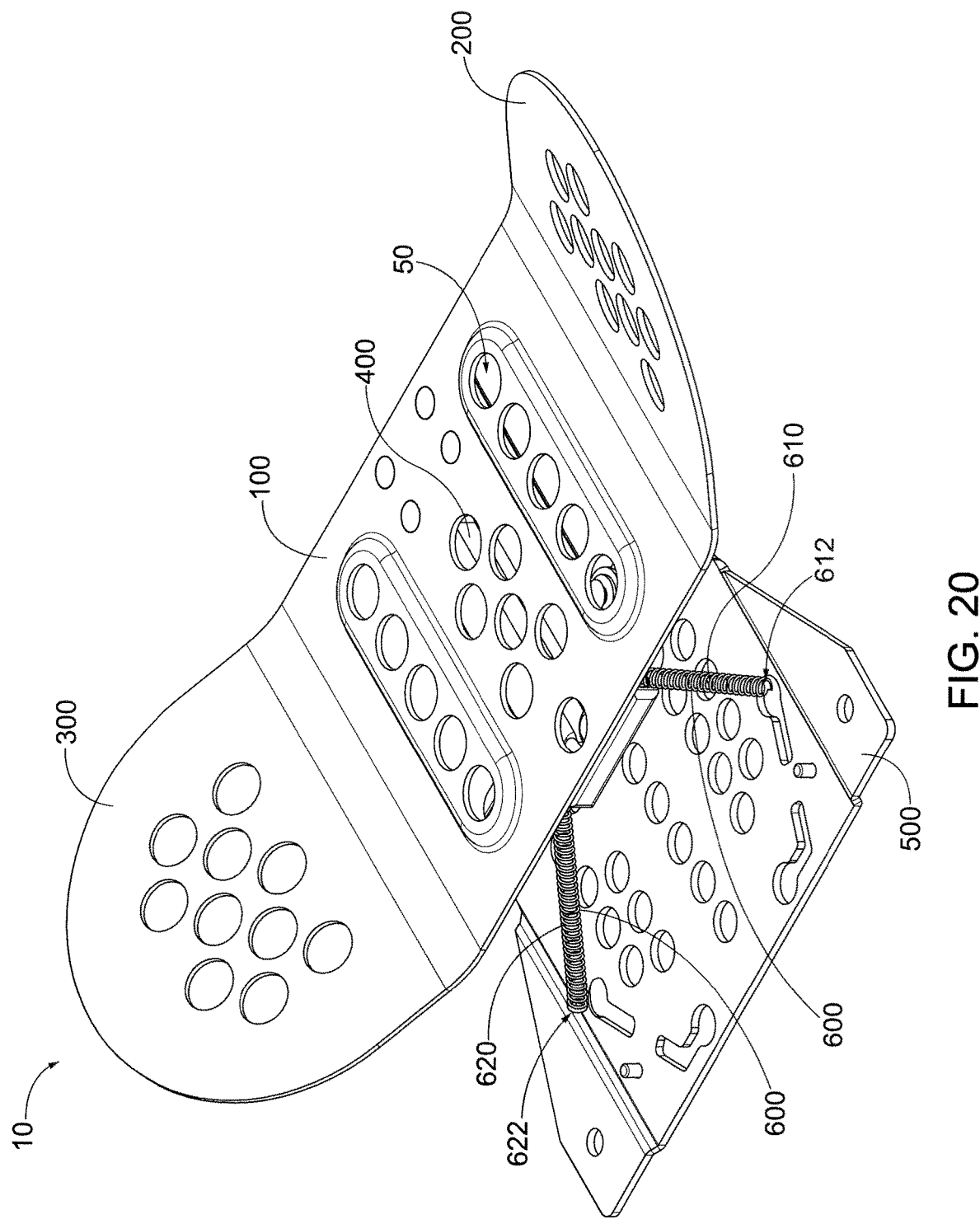
FIG. 20 is a bottom perspective view of a seat headrest assembly in a raised position with a cover plate removed for clarity, in accordance with an example of the disclosure.

With particular reference to FIGS. 11 and 14, the rail assembly 400 is secured to the backside 140 of the center plate 100. The rail assembly 400 and the center plate 100 move in unison but move relative to the cover plate 700 and the mounting plate 500. Alternatively, it may be said the cover plate 700 and the mounting plate 500 move in unison but move relative to the rail assembly 400 and the center plate 100. However, when the mounting plate 500 is rigidly secured to a passenger seating assembly the rail assembly 400 and the center plate 100 move in a vertical direction relative to the mounting plate 500 and the cover plate 700. When the rail assembly 400 and the center plate 100 are moved in a vertical direction the position of the mounting plate 500 and the cover plate 700 are maintained relative to the passenger seating assembly. When the rail assembly 400 and the center plate 100 are at their highest position it is referred to herein as the raised position. When the rail assembly 400 and the center plate 100 are at their lowest position it is referred to herein as the lowered position. When in the lowered position the rail assembly 400 and the center plate 100 are generally aligned with the mounting plate 500 and the cover plate 700 wherein the mounting plate 500 and the cover plate 700 are concealed behind (with the exception of the weight reducing apertures 50) the center plate 100.

For illustrative purposes, FIGS. 15-20 illustrate the same views and features as illustrated by FIGS. 8-13, respectively, but with the cover plate or mounting plate removed. With the cover plate or mounting plate removed, the rail assembly 400 and the adjustment mechanism 600 are visible. Specifically, the first compression spring 610 and the second compression spring 620 are illustrated. One end of each of the first compression spring 610 and the second compression spring 620 are attached to the cover plate (not shown in this figure for clarity). Additionally, or alternatively, that respective end (or outermost end) 612, 622 of each of the first compression spring 610 and the second compression spring 620 may be attached to the mounting plate 500 as the mounting plate is maintained in alignment with the cover plate when the headrest assembly 10 is in operation between the raised position and the lowered position. The opposing end (or innermost end) 614, 624 of each the first compression spring 610 and the second compression spring 620 are attached to the rail assembly 400. Specifically, the innermost end 614, 624 are attached to a position near, at, or on the base 450 of the rail assembly 400. Additionally, or alternatively, the innermost end 614, 624 of each the first compression spring 610 and the second compression spring 620 may be attached directly to the center plate 100 as the center plate 100 is maintained in alignment and further secured to the rail assembly 400 when the headrest assembly 10 is in operation between the raised position and the lowered position. In these examples, because each compression spring is secured at or near the bottom of the rail assembly 400 the centering position of the headrest, where each compression spring is in the greatest compression, is below the lateral center of the rail assembly 400 and the center plate 100. Therefore, the length of travel to the lowered position is shorter than the length of travel to the raised position. Likewise, the centering position, where each compression spring is in the greatest compression, may additionally be below the lateral center of the cover plate 700 and the mounting plate 500, depending upon the shape and configuration of the cover plate 700 and the mounting plate 500.

When in the raised position the center plate 100 and the rail assembly 400 elevate to the highest possible position under the pressure applied in the vertical direction by way of the first compression spring 610 and the second compression spring 620. The highest possible position may be defined by the central groove 430 and the central roller 440. Specifically, the central groove 430 may terminate and provide a stop to the central roller 440. Additionally, or alternatively, the highest possible position may be defined by a stop plate, detent, or other position defining mechanism between the rollers and their respective grooves or guides, between the cover plate and the rail assembly, between the mounting plate and the rail assembly, between the cover plate and the center plate, between the mounting plate and the center plate, a combination thereof, or the like. Similarly, the lowest possible position may be defined by the central groove 430 and the central roller 440. Specifically, the central groove 430 may terminate and provide a stop to the central roller 440. Additionally, or alternatively, the lowest possible position may be defined by a stop plate, detent, or other position defining mechanism between the rollers and their respective grooves or guides, between the cover plate and the rail assembly, between the mounting plate and the rail assembly, between the cover plate and the center plate, a combination thereof, or the like.

To impart movement between the raised position and the lowered position the first compression spring 610 and the second compression spring 620 each provide a compression force between their secured positions at the opposing ends of each compression spring. The compression force of each respective compression spring impart a force or movement in a direction parallel with one another but from opposing sides of the headrest assembly 10. Because the opposing ends of each compression spring are secured to components which move relative to one another the force imparted by the compression spring provide movement between the raised position and the lowered position. Specifically, the first compression spring and the second compression spring, which work together from opposing lateral sides of the rail assembly 400 drive and maintain the headrest assembly 10 in either the raised position or the lowered position. As the compression spring moves between the raised position and the lowered position the compression force increases at each compression spring and drives the headrest assembly between the raised position and the lowered position. Further, because both compression springs remain in compression in the raised position and the lowered position, by way of a stop mechanism in the raised position and/or the lowered position, the headrest assembly is maintained in each respective position. The headrest, however, does not stop or is not maintained in an intermediate position between the raised position and the lowered position. Specifically, the increase in the compression force resists the headrest from stopping in an intermediate position. Stated simply, the length of each respective compression spring 610, 620 is shorter in the intermediate position than it is when it is in either the raised position and the lowered position. This shorter length increases the compression force at this state, thereby, maintaining movement of the headrest assembly in either direction relative a self-centering position, or central most position. When the outer most end 612, 622 of each respective compression spring moves above the self-centering position, or above the inner most end 614, 624 of each respective compression spring, the headrest assembly is forced into the raised position. When the outer most end 612, 622 of each respective compression spring moves below the self-centering position, or below the inner most end 614, 624 of each respective compression spring, the headrest assembly is forced into the lowered position. This is accomplished with limited interaction from a passenger or passenger vehicle staff member to secure a headrest assembly into a position. Moreover, each of the raised position and the lowered position are maintained without relying on an independent locking mechanism, such as a ratchet assembly, lock nut, clamping arrangement, or the like that requires further intervention from a passenger or passenger vehicle staff member. Such an adjustment mechanism may be referred to herein as an over-centering linkage. Although the compression springs are provided herein as one example, other over-centering linkages may be provided or a combination of over-centering linkages may be provided.

Figure 21:
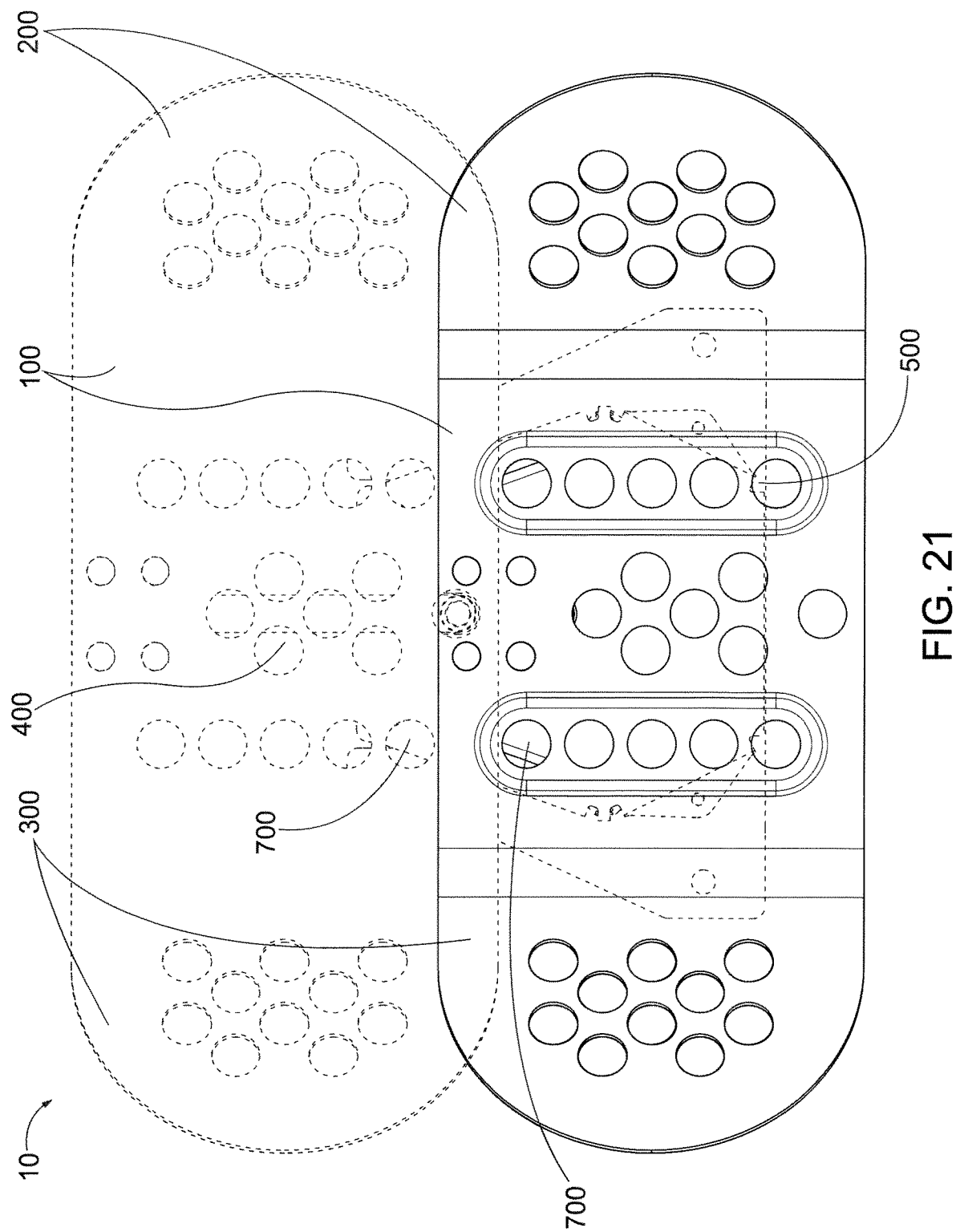
FIG. 21 is a front view of a seat headrest assembly representative of both a raised and lowered position, in accordance with an example of the disclosure.

Turning now to FIG. 21, a headrest assembly is illustrated in the lowered position with the mounting plate 500 and the cover plate 700 illustrated by hidden lines. Further, FIG. 21 illustrates the center plate 100 in a raised position, also illustrated by hidden lines. FIG. 21 is illustrative of the degree of movement between each respective position. The remaining features of the figures are as labeled and described in the other figures.

Figure 22:
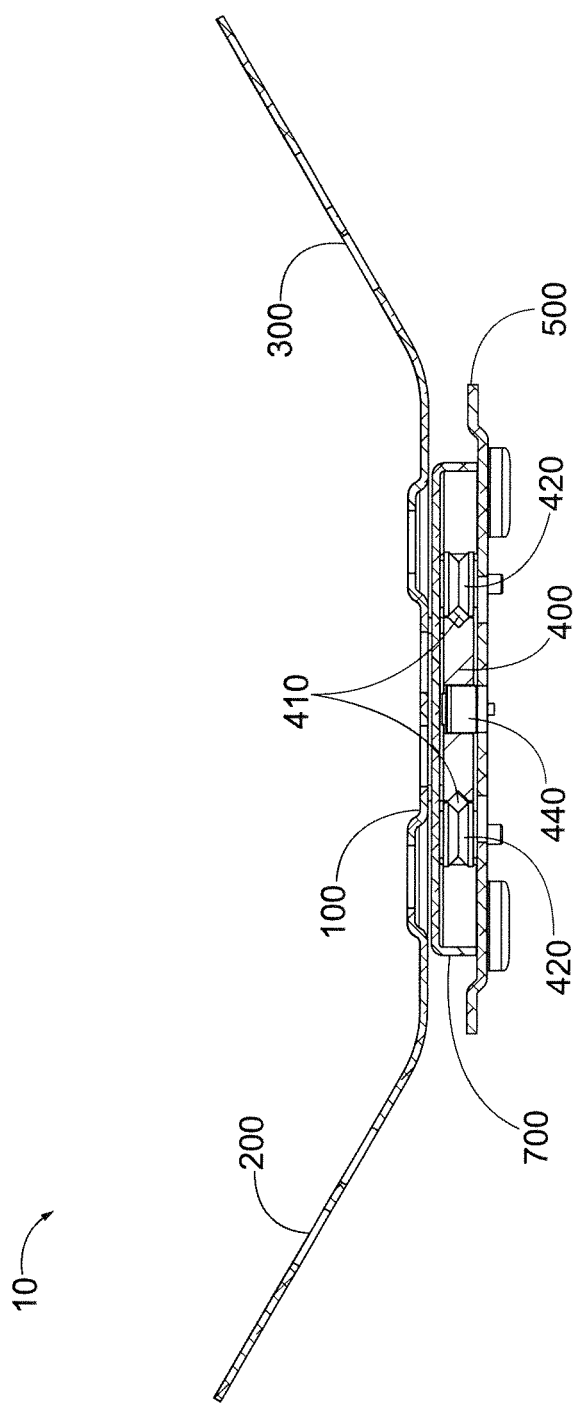
FIG. 22 is a cross-section of a seat headrest assembly in the lowered position as taken at line 22-22 of FIG. 1.
Figure 23:
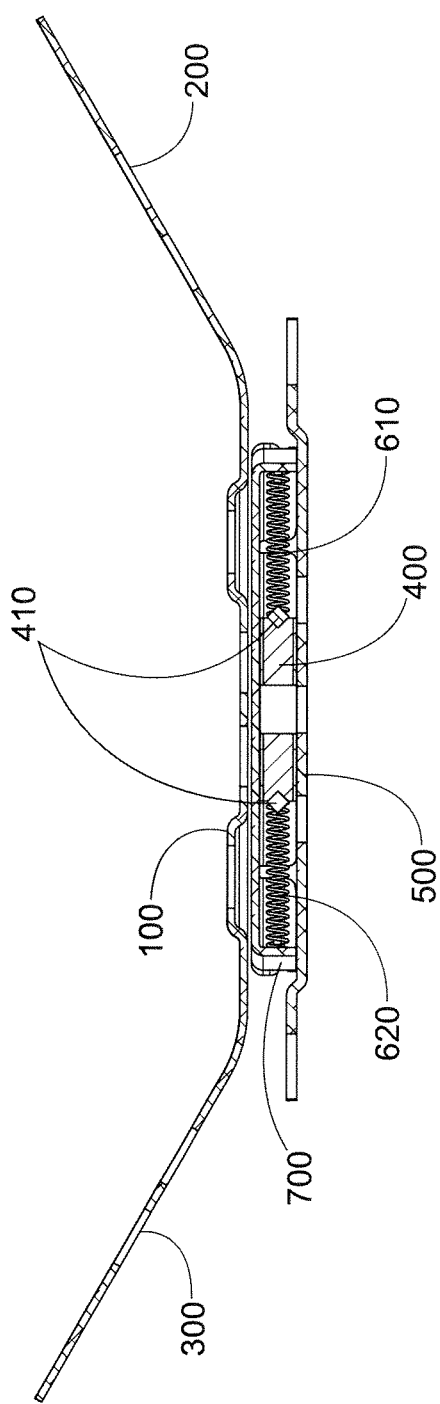
FIG. 23 is a cross-section of a seat headrest assembly in the lowered position as taken at line 23-23 of FIG. 1.
Figure 24:
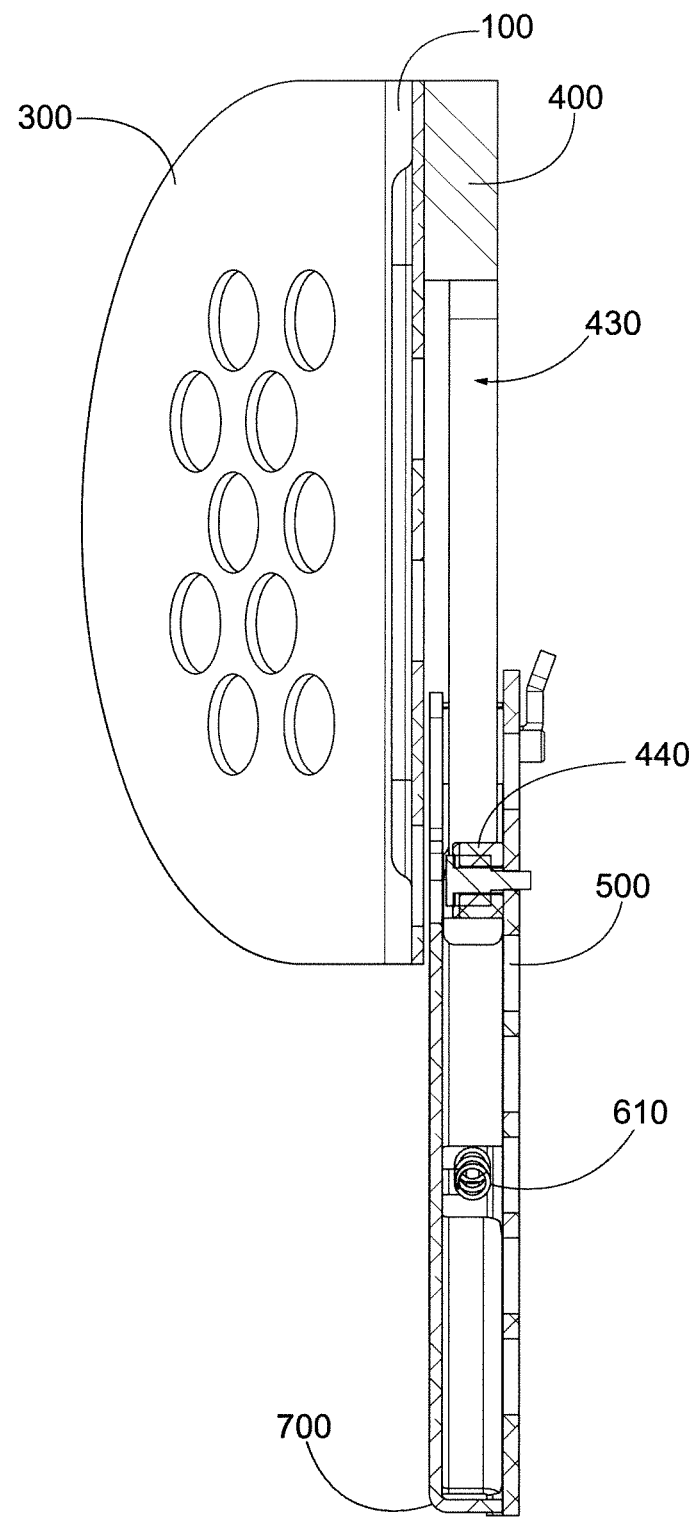
FIG. 24 is a cross-section of a seat headrest assembly in the raised position as taken at line 24-24 of FIG. 8.

FIG. 22 is a lateral cross-section of the headrest assembly at line 22-22 of FIG. 1. Illustrated here are the v-shaped rollers 420 mating with the inverted v-shaped guides 410. Also illustrated is the central roller 440 positioned in the central groove 430. Each of these components are concealed by or protected between the cover plate 700 and the mounting plate 500. The rail assembly is further secured to the center plate 100. FIG. 23 is another lateral cross-section of the headrest assembly at line 23-23. In FIG. 23 the adjustment mechanism 600 and the first compression spring 610 and the second compression spring 620 are further illustrated between the cover plate 700 and the rail assembly 400. FIG. 24 is a vertical cross-section of the headrest assembly at line 24-24 of FIG. 1. Illustrated here are the center plate 100, the cover plate 700, the mounting plate 500, and the rail assembly 400. Also illustrated is a compression spring 620 extending from the cover plate 700 to the base of the rail assembly 400. The remaining features of the figures are as labeled and described in the other figures.

While this invention has been described with reference to examples thereof, it shall be understood that such description is by way of illustration only and should not be construed as limiting the scope of the claimed examples. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. A passenger seating headrest assembly comprising:
a headrest center plate having a backside;
a rail assembly secured to the backside and having a pair of guides where each guide of the pair of guides is positioned at a respective lateral side of the rail assembly extending in a vertical direction;
a mounting plate and a cover plate secured together where a pair of rollers are rotatably secured to the mounting plate or the cover plate and the pair of rollers mate with a respective guide of the pair of guides wherein the headrest center plate and the rail assembly move vertically relative the mounting plate and the cover plate; and
an adjustment mechanism provided between the headrest center plate and the mounting plate for driving the headrest center plate between a raised position and a lowered position relative the mounting plate.

2. The passenger seating headrest assembly of claim 1 wherein the rail assembly further comprises a groove positioned centrally within the rail assembly, extending in the vertical direction, and which receives a central roller having a rotational axis parallel to the rotational axis of the pair of rollers.

3. The passenger seating headrest assembly of claim 1 wherein the adjustment mechanism drives the headrest center plate between the raised position and the lowered position only.

4. The passenger seating headrest assembly of claim 1 wherein the adjustment mechanism is an over-centering linkage.

5. The passenger seating headrest assembly of claim 1 wherein the adjustment mechanism further comprises an opposing pair of compression springs where each compression spring of the opposing pair of compression springs are secured between the cover plate and the rail assembly.

6. The passenger seating headrest assembly of claim 5 wherein the opposing pair of compression springs are in greater compression between the raised position and the lowered position than when in the raised position or the lowered position.

7. The passenger seating headrest assembly of claim 5 wherein the opposing pair of compression springs are in greater compression between the raised position and the lowered position than when in the raised position and the lowered position.

8. The passenger seating headrest assembly of claim 5 wherein the opposing pair of compression springs are in the greatest compression when each compression spring of the opposing pair of compressions springs are in a parallel orientation relative one another.

9. The passenger seating headrest assembly of claim 1 wherein the cover plate and the headrest center plate conceal the rail assembly and the adjustment mechanism, in combination, in both the raised position and in the lowered position.

10. The passenger seating headrest assembly of claim 1 further comprising weight reducing apertures wherein the cover plate and the headrest center plate conceal the rail assembly and the adjustment mechanism, in combination, in both the raised position and in the lowered position with the exception of the weight reducing apertures.

\* \* \* \* \*